(12) United States Patent
Blaha, Jr. et al.

(10) Patent No.: US 11,493,642 B2
(45) Date of Patent: Nov. 8, 2022

(54) ESTIMATION OF BAROMETRIC PRESSURE MEASUREMENT BIAS BY COMPENSATING FOR ENVIRONMENT-RELATED EFFECTS

(71) Applicant: Polaris Wireless, Inc., Mountain View, CA (US)

(72) Inventors: Jerome Arthur Blaha, Jr., Redwood City, CA (US); Scot Douglas Gordon, Redmond, CA (US); Jeffrey Noel Wu, Santa Clara, CA (US); Jian Zhu, Cupertino, CA (US)

(73) Assignee: Polaris Wireless, Inc., Mountain View, CA (US)

( * ) Notice: Subject to any disclaimer, the term of this patent is extended or adjusted under 35 U.S.C. 154(b) by 32 days.

(21) Appl. No.: 17/236,588

(22) Filed: Apr. 21, 2021

(65) Prior Publication Data
US 2021/0364653 A1 Nov. 25, 2021

Related U.S. Application Data

(60) Provisional application No. 63/027,892, filed on May 20, 2020, provisional application No. 63/027,902, (Continued)

(51) Int. Cl.
*G01S 19/40* (2010.01)
*G01S 19/48* (2010.01)
(Continued)

(52) U.S. Cl.
CPC .............. *G01S 19/393* (2019.08); *G01C 5/06* (2013.01); *G01C 21/005* (2013.01);
(Continued)

(58) Field of Classification Search
CPC ........ G01S 19/40; G01S 19/48; G01S 19/393; G01S 5/0294; G01C 5/06; G01C 21/005; G01L 19/0092; G01L 27/002
(Continued)

(56) References Cited

U.S. PATENT DOCUMENTS 6,970,795 B1 * 11/2005 Burgett .................. G01S 19/42
702/85
2012/0182180 A1 7/2012 Wolf et al.
(Continued)

FOREIGN PATENT DOCUMENTS

CN 103688572 A * 3/2014 ............. G06Q 50/01
CN 105190233 A * 12/2015 ........... G01C 21/206

OTHER PUBLICATIONS

Notice of Allowance, U.S. Appl. No. 17/236,592, dated Jun. 17, 2022.

*Primary Examiner* — Harry K Liu
(74) *Attorney, Agent, or Firm* — McGeary Cukor LLC; Kenneth Ottesen; Jason Paul DeMont

(57) ABSTRACT

A method for estimating the pressure measurement bias of a barometric sensor in a wireless terminal. A location engine using the method generates an enhanced estimate of the measurement bias. The location engine generates the enhanced estimate based in part on relatively coarse estimates of the elevation of the wireless terminal. Each coarse estimate of elevation is often generated from noisy measurements, such as measurements of signals transmitted by Global Positioning System (GPS) satellites, and has an associated uncertainty. The location engine accounts for the uncertainty in these estimates of elevation by applying an optimal estimation technique, such as Kalman filtering, and by compensating for environment-related effects. Compensating Includes filtering across a plurality of lateral locations and imposing a lower bound of bias uncertainty at the lateral locations. Once the location engine generates the enhanced estimate of measurement bias, it can generate improved estimates of elevation of the wireless terminal.

24 Claims, 18 Drawing Sheets

Related U.S. Application Data filed on May 20, 2020, provisional application No. 63/027,906, filed on May 20, 2020.

(51) Int. Cl.
| | |
|---|---|
| *G01S 19/39* | (2010.01) |
| *G01W 1/10* | (2006.01) |
| *G01L 19/00* | (2006.01) |
| *G01L 27/00* | (2006.01) |
| *G01S 5/02* | (2010.01) |
| *G01C 5/06* | (2006.01) |
| *G01C 21/00* | (2006.01) |
| *H04W 4/029* | (2018.01) |

(52) U.S. Cl.
CPC ........ *G01L 19/0092* (2013.01); *G01L 27/002* (2013.01); *G01S 5/0264* (2020.05); *G01S 5/0294* (2013.01); *G01S 19/48* (2013.01); *G01W 1/10* (2013.01); *H04W 4/029* (2018.02)

(58) Field of Classification Search
USPC .................................................. 342/357.23
See application file for complete search history.

(56) References Cited

U.S. PATENT DOCUMENTS

| | | | |
|---|---|---|---|
| 2020/0080865 A1* | 3/2020 | Ervin ................. | G01C 21/3667 |
| 2022/0141637 A1* | 5/2022 | Pellegrini .............. | H04W 4/90 |
| | | | 455/404.1 |

* cited by examiner

ESTIMATION OF BAROMETRIC PRESSURE MEASUREMENT BIAS BY COMPENSATING FOR ENVIRONMENT-RELATED EFFECTS

CROSS REFERENCE TO RELATED APPLICATIONS

This application claims the benefit of:
(1) U.S. Provisional Application Ser. No. 63/027,892, filed May 20, 2020, and
(ii) U.S. Provisional Application Ser. No. 63/027,902, filed May 20, 2020, and
(iii) U.S. Provisional Application Ser. No. 63/027,906, filed May 20, 2020,
all of which are incorporated by reference herein. If there are any contradictions or inconsistencies in language between this application and any document that has been incorporated by reference that might affect the interpretation of the claims in this application, the claims in this application should be interpreted to be consistent with the language in this application.

This application is related to the following co-pending applications, which are filed on the same day as the present application and incorporated by reference herein:
(i) "Estimation of Barometric Pressure Measurement Bias Based on Global Navigation Satellite System Signals," U.S. application Ser. No. 17/236,581, and
(ii) "Estimation of Barometric Pressure Measurement Bias with Adjustment Based on a Value Expected for a Wireless Terminal," U.S. application Ser. No. 17/236,592.

FIELD OF THE INVENTION

The present invention relates to telecommunications in general and, more particularly, to a technique for generating an estimate of the measurement bias of a barometric sensor in a wireless terminal, based on compensating for environment-related effects on electromagnetic signals.

BACKGROUND OF THE INVENTION

The salient advantage of wireless telecommunications over wireline telecommunications is that the user of a wireless terminal, such as a cell phone or smartphone, is afforded the opportunity to use his or her terminal anywhere. On the other hand, the salient disadvantage of wireless telecommunications lies in that fact that because the user is mobile, an interested party might not be able to readily ascertain the location of the user.

Such interested parties might include both the user of the wireless terminal and a remote party. There are a variety of reasons why the user of a wireless terminal might be interested in knowing his or her location. For example, the user might be interested in telling a remote party where he or she is or, alternatively, the user might seek advice in navigation.

In addition, there are a variety of reasons why a remote party might be interested in knowing the location of the user. For example, the recipient of an E 9-1-1 emergency call from a wireless terminal might be interested in knowing the location of the wireless terminal so that emergency services vehicles can be dispatched to that location.

There are many techniques in the prior art for estimating the location of a wireless terminal. In accordance with some techniques, the location of a wireless terminal is estimated, at least in part, from measurements of electromagnetic signals that are reported by the wireless terminal. The reported measurements are of signals measured by the wireless terminal that are transmitted by one or more base stations and, in some cases, by a Global Navigation Satellite System (GNSS) such as the Global Positioning System (GPS).

In order for these techniques to work, at least some of the transmitted signals have to be strong enough to allow for accurate measurement by the wireless terminal and for reliable processing by the particular estimation technique. The measured strengths of the different signals can vary significantly in certain environments such as where signal obstructions are present, including natural obstructions such as mountains and artificial obstructions such as buildings. The measured strengths of the different signals can also vary significantly because of reflection, deflection, and scattering of the signals. This variation in measured signal strength can affect estimation of a wireless terminal's location, including its elevation.

There are techniques in the prior art for estimating the elevation of a wireless terminal other than those based on electromagnetic signal measurement. Some of these techniques rely on the relationship between atmospheric pressure, $P_A$, and elevation, $Z_A$, in which $P_A$ decreases logarithmically with $Z_A$, according to the formula:

$$Z_A = -H * \ln\left(\frac{P_A}{P_0}\right) \qquad \text{(Eq. 1)}$$

wherein:
$P_0$ is the reference atmospheric pressure, and
H is the scale height of the atmosphere, which is the elevation at which the atmospheric pressure has decreased to $e^{-1}$ times its value at mean sea level (e.g., approximately 7000 meters).

It is known in the prior art how to estimate the elevation of an object—such as an airplane—using Equation 1. Aircraft altimeters have used this technique for decades, and it is known to be highly accurate. Furthermore, it is known in the prior art how to estimate the elevation of a wireless terminal using Equation 1.

In order to obtain barometrically a good estimate of elevation (also known as a "z-estimate"), it is necessary to have both i) a good pressure measurement at the location for which the estimate of elevation is being determined and ii) a good pressure measurement at a pressure reference. The measurement provided by the pressure reference can be used to determine an estimate of the sea-level pressure for a location of interest or the pressure of another reference.

A wireless terminal that is capable of measuring barometric pressure can be used to provide pressure measurements that are needed to determine barometrically the terminal's elevation at its current position. In order to determine the elevation of the wireless terminal, however, it is necessary to consider various sources of error, including the pressure measurement bias of the wireless terminal's barometric sensor device.

The pressure measurement bias of the sensor device has two components. The first bias component is introduced during the manufacturing process and is typically within 10 meters in equivalent height variation, but can be as much as 40 meters. This bias component can vary across barometric sensor devices of different manufacturers and even across different production batches of the same manufacturer. The second bias component becomes apparent as a wireless terminal ages and can drift a few meters per year. After accounting for the two bias components, the total measurement bias for a wireless terminal, especially an older terminal, can be in the tens of meters.

SUMMARY OF THE INVENTION

The pressure measurement bias that is present in a wireless terminal's barometric sensor device affects the barometric pressure measurements provided by the terminal. Nevertheless, the wireless terminal can measure changes in pressure accurately. Indeed, the accuracy of a barometer-measured change in relative elevation is typically in the range of a few centimeters after filtering out noise. One implication of this is that once it has been generated, the estimated bias of barometric pressure can then be used to adjust the wireless terminal's pressure measurement at any elevation, and, as a result, can be used to provide an accurate estimate of elevation. The present invention enables the pressure measurement bias of a barometric sensor in a wireless terminal, such as a smartphone, to be estimated and compensated for, thereby facilitating the improved estimation of the wireless terminal's elevation.

A wireless terminal can also attempt to estimate its elevation based on signals from a Global Navigation Satellite System (GNSS). This includes estimating its elevation based on signals from Global Positioning System (GPS) satellites. But estimation based on signals from satellites can be problematic, in that a GPS-based estimate of elevation is prone to error in some operating environments.

One problem is that each GPS-based estimate of elevation is often generated from noisy measurements of unreliable signals. In particular, when a wireless terminal is indoors, the terminal's estimated location based on GPS, including its elevation, is often not accurate enough to be directly useful. This can be attributed to electromagnetic signals from the GPS satellites being attenuated and scattered by roofs, walls, and other objects when a wireless terminal is within a building. Each GPS-based estimate of elevation has an associated uncertainty that reflects the quality of the GPS signals.

Even though a GPS-based estimate of elevation might not be directly useful by itself, knowing its uncertainty makes it useful in generating an instantaneous estimate of measurement bias of barometric pressure and a corresponding estimate of measurement bias uncertainty. The instantaneous estimate is a relatively coarse estimate, which is attributable to the noisy GPS-based elevation estimate, and corresponds to a particular moment in time.

An optimal estimation technique, such as Kalman filtering, can be used to generate an enhanced estimate of the wireless terminal's pressure measurement bias. The uncertainty, or error, in the GPS estimates of elevation—and, by extension, in the instantaneous estimates of pressure measurement bias—can be accounted by using the Kalman filter. Optimal Kalman filtering requires the error distribution in the elevation estimates to be ideally zero-mean Gaussian. Ideal conditions, however, are typically lacking in certain environments, such as in some indoor locations where multiple signal measurements at a given location can be highly correlated. Under non-ideal conditions, measurements of satellite signals can vary significantly and can be characterized by an inherent bias attributed to the environment at the location.

In accordance with the illustrative embodiment of the present invention, a location engine disclosed herein accounts for the inherent bias associated with one or more geographic locations and compensates for the environment-related effects at said locations. In particular, the location engine compensates for environment-related effects on electromagnetic signals from GPS satellites at said locations. The location engine uses data points across a plurality of different lateral locations. Different GPS estimates of elevation—along with corresponding barometric pressure measurements also made by the wireless terminal—are used across:

i. a representative sample of lateral geographic locations x-y (e.g., latitude/longitude, etc.), or "geolocations", and/or ii. a representative sample of z-axis elevations, even for a given x-y location, and/or iii. sufficiently different times (e.g., time separations that are a function of satellite orbits, etc.).

In some embodiments of the present invention, the location engine enforces the use of a sufficient distribution of said data points that conditions the error of the GPS estimates of elevation toward being zero-mean Gaussian.

The location engine keeps track of the data points, such as the instantaneous estimates referred to above, in a multidimensional array, such as a matrix. This involves dividing up a geographic region into an M-by-N grid that partitions the geographic region into a plurality of possible lateral geographic locations of a wireless terminal. Each grid square, or bin, in the geographic grid is representative of a lateral location x-y of the wireless terminal. As the location engine accumulates data for a representative sample of the different grid squares, the location engine updates the Kalman filter as described herein.

In actual practice, although the use of data points across a plurality of lateral locations can compensate for environment-related bias, additional compensating is often necessary to improve the results. For example, a wireless terminal might visit only a limited number of lateral locations over a given timeframe; some of those lateral locations might have significant environment-related bias, thereby skewing the Kalman filtering. Accordingly, in some embodiments of the present invention, the location engine imposes a lower bound for measurement bias uncertainty associated with one or more lateral locations x-y, wherein a predetermined value for the lower bound can be specific to each lateral location. The location engine updates the Kalman filter while accounting for the imposed lower bound of measurement bias uncertainty, on a location-by-location basis. In this way, the location engine is able to mitigate further the unfavorable effects of an overly-biased propagation environment on generating an enhanced estimate of the wireless terminal's pressure measurement bias.

Subsequently, the location engine is able to estimate the elevation of the wireless terminal based on a current barometric pressure measurement and an enhanced estimate of measurement bias and bias uncertainty that is the result of the Kalman filtering. Essentially, the location engine is able to achieve a higher level of accuracy in basing elevation on pressure measurements, by enhancing the estimate of the bias with an optimal combining of multiple GPS estimates of elevation. Such an improvement is possible even though the same GPS estimates can be unreliable to use individually or even when combined albeit in a suboptimal way.

GPS-based estimates of elevation are considered in the technique of the illustrative embodiment. It will be clear to those skilled in the art, however, and after reading this specification, how to make and use embodiments of the present invention that use GNSS-based estimates of elevation based on measurements from GNSS satellites than are different from GPS satellites, or from estimates of elevation based on signals received from yet another system or source that is external to the wireless terminal. Furthermore, although Kalman filtering is featured in the illustrative embodiment, it will be clear to those skilled in the art, after reading this specification, how to make and use embodiments of the present invention that use a different type of optimal estimation algorithm, or a different type of filtering, or both.

A first illustrative method of estimating measurement bias of barometric pressure measured by a wireless terminal comprises: receiving, by the data processing system, a first plurality of estimates of elevations made by the wireless terminal, wherein the estimates of elevations in the first plurality correspond to different lateral locations of the wireless terminal, including a first estimate of a first elevation that corresponds to a first lateral location, and; receiving, by the data processing system, a second plurality of measurements of barometric pressure made by the wireless terminal and representative of the different lateral locations of the wireless terminal, including a first measurement of barometric pressure that is representative of the first lateral location; generating, by the data processing system, a third plurality of estimates of bias of barometric pressure measured by the wireless terminal and representative of the different lateral locations, including a first estimate of bias of barometric pressure that is representative of the first lateral location, wherein each estimate of bias of barometric pressure in the third plurality is based on (i) a corresponding measurement of barometric pressure made by the wireless terminal and in the second plurality, and (ii) a corresponding estimate of elevation made by the wireless terminal and in the first plurality; and generating, by the data processing system, an enhanced estimate of bias of barometric pressure, by applying a first filter having a current state and previous states existing prior to the current state, wherein the current state is based on the third plurality of estimates of bias of barometric pressure, wherein the estimates of bias of barometric pressure in the third plurality are individually and iteratively applied to respective previous states of the first filter.

A second illustrative method of estimating measurement bias of barometric pressure measured by a wireless terminal comprises: receiving, by the data processing system, a first estimate of a first elevation made by the wireless terminal, wherein the first estimate of the first elevation corresponds to a first lateral location of the wireless terminal; receiving, by the data processing system, a first measurement of barometric pressure made by the wireless terminal and representative of the first lateral location; generating, by the data processing system, a first estimate of bias of barometric pressure measured by the wireless terminal based on (i) the first measurement of barometric pressure made by the wireless terminal and (ii) a first reference pressure value that corresponds to the first elevation and first lateral location; and generating, by the data processing system, an enhanced estimate of bias of barometric pressure, by applying a first Kalman filter having a current state and a previous state existing prior to the current state, wherein the current state is based on (i) the first estimate of bias of barometric pressure, (ii) the previous state of the first Kalman filter, and (iii) a Kalman gain, and wherein the previous state of the first Kalman filter is based in part on at least one additional estimate of bias that corresponds to at least a second lateral location of the wireless terminal.

A third method of estimating measurement bias of barometric pressure measured by a wireless terminal, the method comprising: receiving, by the data processing system, a first estimate of a first elevation made by the wireless terminal, wherein the first estimate of the first elevation corresponds to a first lateral location of the wireless terminal; receiving a first uncertainty of the first estimate of the first elevation; receiving, by the data processing system, a first measurement of barometric pressure made by the wireless terminal and representative of the first lateral location; generating, by the data processing system, a first estimate of bias of barometric pressure measured by the wireless terminal based on the first measurement of barometric pressure made by the wireless terminal; generating, by the data processing system, a first estimate of bias uncertainty for the first lateral location based on the first uncertainty of the first estimate of the first elevation; and generating, by the data processing system, an enhanced estimate of bias of barometric pressure, by applying a first Kalman filter having a current state and a previous state existing prior to the current state, wherein the current state is based on (i) the first estimate of bias of barometric pressure, (ii) the previous state of the first Kalman filter, and (iii) a Kalman gain, wherein the previous state of the first Kalman filter is based in part on at least one additional estimate of bias that corresponds to at least a second lateral location of the wireless terminal, and wherein the Kalman gain is based on a first value that defines a lower bound for the first estimate of bias uncertainty.

DEFINITIONS

Figure 1:
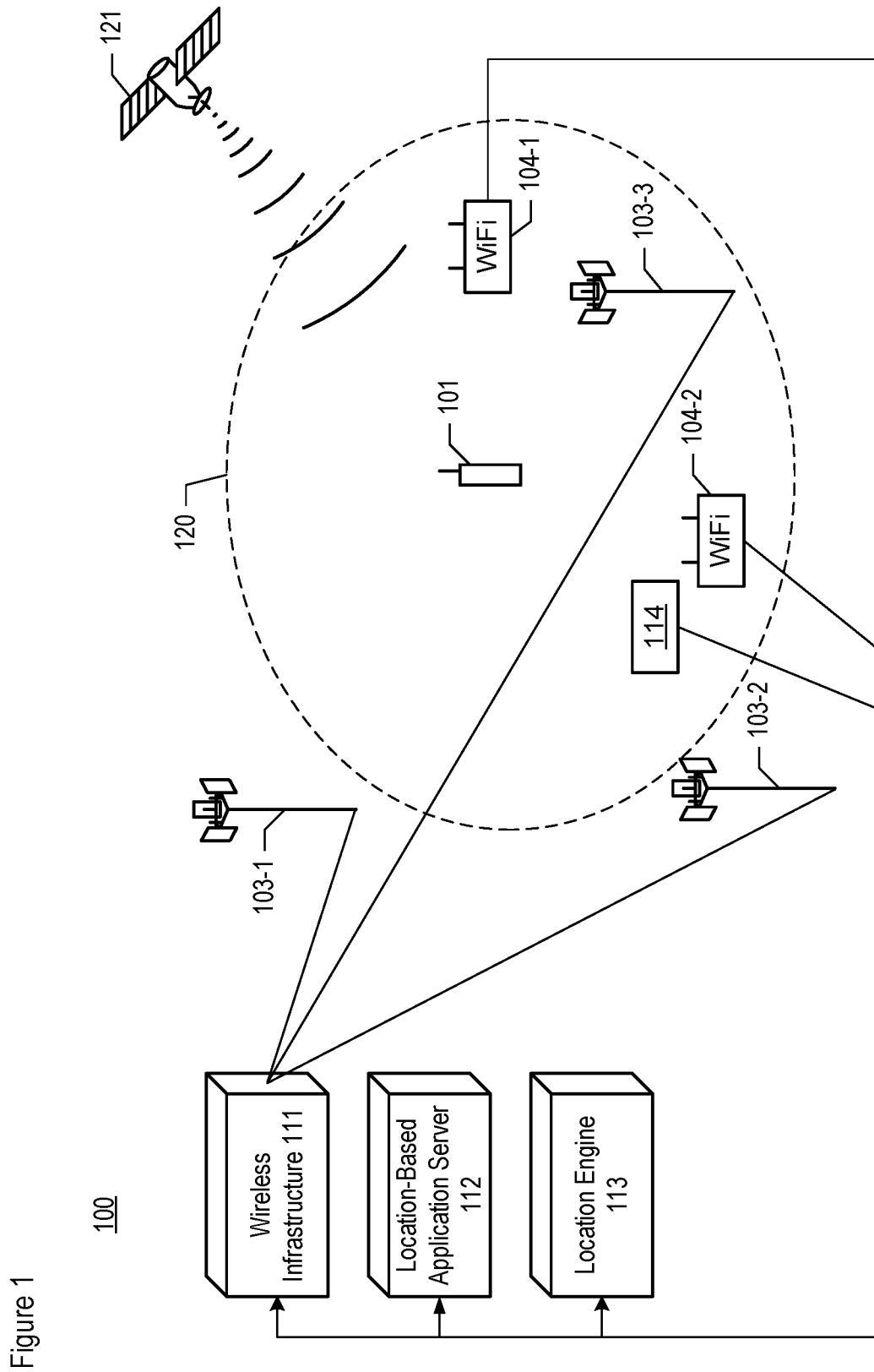
FIG. 1 depicts a diagram of the salient components of wireless telecommunications system 100 in accordance with the illustrative embodiment of the present invention.

Barometric Pressure—For the purposes of this specification, the term "barometric pressure" is defined as a pressure measured by a barometer. This pressure relates to atmospheric pressure, which is the force per unit area exerted on a surface by the weight of the air above that surface in the atmosphere of Earth.

Based on—For the purposes of this specification, the phrase "based on" is defined as "being dependent on" in contrast to "being independent of". The value of Y is dependent on the value of X when the value of Y is different for two or more values of X. The value of Y is independent of the value of X when the value of Y is the same for all values of X. Being "based on" includes both functions and relations.

Bias—For the purposes of this specification, the term "bias" is defined as a systematic distortion of a statistical result (e.g., a measurement, etc.) due to a factor not allowed for in its derivation.

Elevation—For the purposes of this specification, the term "elevation" is defined as the height relative to a reference (e.g., mean sea level, ground level, etc.).

Generate—For the purposes of this specification, the infinitive "to generate" and its inflected forms (e.g., "generating", "generation", etc.) should be given the ordinary and customary meaning that the terms would have to a person of ordinary skill in the art at the time of the invention.

Geographic Information System—For the purposes of this specification, the phrase "geographic information system (GIS)" is defined as a system designed to capture, store, manipulate, analyze, manage, and present spatial or geographic data.

Height—For the purposes of this specification, the term "height" should be given the ordinary and customary meaning that the term would have to a person of ordinary skill in the art at the time of the invention.

Identity of a Radio Signal—For the purposes of this specification, the phrase "identity of a radio signal" is defined as one or more indicia that distinguish one radio signal from another radio signal.

Lateral Location—For the purposes of this specification, a "lateral location" is defined as information that is probative of latitude or longitude or latitude and longitude.

Location—For the purposes of this specification, the term "location" is defined as a zero-dimensional point, a finite one-dimensional path segment, a finite two-dimensional surface area, or a finite three-dimensional volume.

Location-Dependent Information—For the purposes of this specification, the term "location-dependent information" is defined as information that varies with location. For example and without limitation, location-dependent information can be:
 i. a measurement of a location-dependent trait (e.g., signal strength, etc.) of a radio signal as received by the wireless terminal,
 ii. the identity of a radio signal as received by the wireless terminal (e.g., in a service environment in which different radio signals transmitted from different locations are assigned different identities, etc.), or
 iii. the identity (e.g., service set identifier [SSID], media access control [MAC] address, etc.) of the base station in communication with the wireless terminal (e.g., in a service environment in which different base stations at different locations are assigned different identities, etc.).

Location-Dependent Trait of a Radio Signal—For the purposes of this specification, the term "location-dependent trait of a radio signal" is defined as a characteristic of a radio signal that varies with:
 i. the location of the transmitter of the signal, or
 ii. the location of the receiver of the signal, or
 iii. both i and ii.
For example and without limitation, the amplitude and phase of a radio signal are generally location-dependent traits of the signal. In contrast, the frequency of a given radio signal is generally not a location-dependent trait of the signal.

Processor—For the purposes of this specification, a "processor" is defined as hardware or hardware and software that performs mathematical and/or logical operations.

Radio—For the purposes of this specification, a "radio" is defined as hardware or hardware and software that is capable of telecommunications via an unguided (i.e., wireless) radio signal of frequency less than 600 GHz.

Receive—For the purposes of this specification, the infinitive "to receive" and its inflected forms (e.g., "receiving", "received", etc.) should be given the ordinary and customary meaning that the terms would have to a person of ordinary skill in the art at the time of the invention.

Transmit—For the purposes of this specification, the infinitive "to transmit" and its inflected forms (e.g., "transmitting", "transmitted", etc.) should be given the ordinary and customary meaning that the terms would have to a person of ordinary skill in the art at the time of the invention.

Wireless Terminal—For the purposes of this specification, the term "wireless terminal" is defined as a device that is capable of telecommunications without a wire or tangible medium. A wireless terminal can be mobile or immobile. A wireless terminal can transmit or receive or transmit and receive. A wireless terminal is also commonly called a smartphone, a cellular telephone ("cellphone"), a wireless transmit/receive unit (WTRU), a user equipment (UE), a mobile station, wireless handset, a fixed or mobile subscriber unit, a pager, a personal digital assistant (PDA), an Internet of Things (IoT) device, a computer, or any other type of device capable of operating in a wireless environment are examples of wireless terminals.

DETAILED DESCRIPTION

Wireless Telecommunications System 100—FIG. 1 depicts a diagram of the salient components of wireless telecommunications system 100 in accordance with the illustrative embodiment of the present invention. Wireless telecommunications system 100 comprises: wireless terminal 101, cellular base stations 103-1, 103-2, and 103-3, Wi-Fi base stations 104-1 and 104-2, wireless infrastructure 111, location-based application server 112, location engine 113, pressure reference 114, and Global Positioning System (GPS) constellation 121, interrelated as shown.

Wireless infrastructure 111, location-based application server 112, location engine 113, cellular base station 103-1, 103-2, and 103-3, and Wi-Fi base stations 104-1 and 104-2 are all connected to one or more interconnected computer networks (e.g., the Internet, a local-area network, a wide-area network, etc.) and, as such, can exchange data.

Wireless terminal 101 is a device that provides bi-directional voice, data, and video telecommunications services to its user. Terminal 101 comprises the hardware and software necessary to perform the tasks disclosed herein, and is further described below and in regard to FIG. 2. Furthermore, wireless terminal 101 is mobile and can be at any location within geographic region 120 at any time.

Wireless terminal 101 can perform at least some of the processes described below and in the accompanying figures. For example and without limitation, wireless terminal 101 is capable of:
 i. receiving one or more radio signals transmitted by cellular base stations 103-1, 103-2, and 103-3, Wi-Fi base stations 104-1 and 104-2, and GPS constellation 121, and
 ii. identifying each radio signal transmitted by cellular base stations 103-1, 103-2, and 103-3, Wi-Fi base stations 104-1 and 104-2, and GPS constellation 121, and of transmitting the identities of those signals, or information related to the identity of those signals, to location engine 113, and
 iii. measuring one or more location-dependent traits of each radio signal transmitted by cellular base stations 103-1, 103-2, and 103-3, Wi-Fi base stations 104-1 and 104-2, and GPS constellation 121, and of transmitting the measurements to location engine 113, and
 iv. estimating lateral location x-y and elevation z, based on one or more of the received and/or measured radio signals, and
 v. transmitting one or more signals to cellular base stations 103-1, 103-2, and 103-3, Wi-Fi base stations 104-1 and 104-2 in accordance with specific parameters (e.g., signal strength, frequency, coding, modulation, etc.), and of transmitting those parameters and estimated location to location engine 113, and
 vi. measuring the temperature and barometric pressure at wireless terminal 101 and transmitting those measurements to location engine 113.

Wireless terminal 101 provides the aforementioned telecommunications services to its user and performs the aforementioned tasks. It will, however, be clear to those skilled in the art, after reading this disclosure, how to make and use embodiments of the present invention in which wireless terminal 101 provides a different set of services or perform a different set of tasks.

Wireless terminal 101 receives precise location data from one or more satellites in GPS constellation 121. As those who are skilled in the art will appreciate after reading this specification, wireless terminal 101 can use technologies other than GPS for location purposes in some other embodiments of the present invention. As those who are skilled in the art will also appreciate after reading this specification, wireless terminal 101 can use a Global Navigation Satellite System (GNSS) other than GPS for location purposes, such as GLONASS, Galileo, Beidou, and other regional systems, for example and without limitation.

Although the illustrative embodiment depicts wireless telecommunications system 100 as comprising one wireless terminal, it will be clear to those skilled in the art, after reading this disclosure, how to make and use alternative embodiments of the present invention that comprise any number of wireless terminals.

Cellular base stations 103-1, 103-2, and 103-3 communicate with wireless infrastructure 111 via wireline and with wireless terminal 101 via radio. Cellular base stations are also commonly referred to by a variety of alternative names such as access points, nodes, network interfaces, and so forth. Although the illustrative embodiment comprises three cellular base stations, it will be clear to those skilled in the art, after reading this disclosure, how to make and use alternative embodiments of the present invention that comprise any number of cellular base stations.

In accordance with the illustrative embodiment of the present invention, cellular base stations 103-1, 103-2, and 103-3 are terrestrial and immobile, and base station 103-3 is situated within geographic region 120. It will be clear to those skilled in the art, after reading this disclosure, how to make and use alternative embodiments of the present invention in which some or all of the base stations are airborne, marine-based, or space-based, regardless of whether or not they are moving relative to the Earth's surface, and regardless of whether or not they are within geographic region 120.

Cellular base stations 103-1, 103-2, and 103-3 comprise the hardware and software necessary to be Long-Term Evolution (LTE) 3GPP-compliant and to perform the processes described below and in the accompanying figures. In some alternative embodiments of the present invention, base stations 103-1, 103-2, and 103-3 communicate in accordance with a different cellular standard. Each of cellular base stations 103-1, 103-2, and 103-3 are capable of continually, for example and without limitation:
 i. receiving one or more radio signals transmitted by wireless terminal 101, and
 ii. identifying each radio signal transmitted by wireless terminal 101, and of transmitting the identities of those signals to location engine 113, and
 iii. measuring one or more location-dependent traits of each radio signal transmitted by wireless terminal 101, and of transmitting the measurements to location engine 113, and
 iv. transmitting one or more signals to wireless terminal 101 in accordance with specific parameters (e.g., signal strength, frequency, coding, modulation, etc.), and of transmitting those parameters to location engine 113, and
 v. broadcasting one or more signals that wireless terminals can use for various purposes (e.g., mobile assisted handoff, location determination, etc.).

Wi-Fi base stations 104-1 and 104-2 communicate with wireless terminal 101 via radio and in accordance with a WiFi protocol. Wi-Fi base stations are also commonly referred to by a variety of alternative names such as access points, nodes, network interfaces, and so forth. In some alternative embodiments of the present invention, base stations 104-1 and 104-2 communicate in accordance with a different IEEE 802.11 standard or wireless LAN standard entirely. Wi-Fi base stations 104-1 and 104-2 are terrestrial, immobile, and within geographic region 120. Although the illustrative embodiment comprises two WI-FI base stations, it will be clear to those skilled in the art, after reading this disclosure, how to make and use alternative embodiments of the present invention that comprise any number of WI-FI base stations.

Each of Wi-Fi base stations 104-1 and 104-2 are capable of continually:
 i. receiving one or more radio signals transmitted by wireless terminal 101, and
 ii. identifying each radio signal transmitted by wireless terminal 101, and of transmitting the identities of those signals to location engine 113, and
 iii. measuring one or more location-dependent traits of each radio signal transmitted by wireless terminal 101, and of transmitting the measurements to location engine 113, and
 iv. transmitting one or more signals to wireless terminal 101 in accordance with specific parameters (e.g., signal strength, frequency, coding, modulation, etc.), and of transmitting those parameters to location engine 113, and v. broadcasting one or more signals that wireless terminals can use for various purposes (e.g., mobile assisted handoff, location determination, etc.).

Wireless infrastructure 111 comprises a switch that orchestrates the provisioning of telecommunications service to wireless terminal 101 and the flow of information to and from location engine 113, as described below and in the accompanying figures. As is known to those skilled in the art, wireless switches are also commonly referred to by other names such as mobile switching centers, mobile telephone switching offices, routers, and so on.

Location-based application server 112 comprises hardware and software that uses the estimate of the location of wireless terminal 101—generated by location engine 113—in a location-based application. Location-based applications are known in the art and provide services such as, and without limitation, E-911 routing, navigation, location-based advertising, weather alerts. In accordance with the illustrative embodiment, location-based application server 112 is implemented on a data-processing system made up of one or more server computers.

Location engine 113 is a data processing system that comprises hardware and software that generates one or more estimates of the location of wireless terminal 101 as described below and in the accompanying figures, including FIG. 3. In accordance with the illustrative embodiment, location engine 113 is implemented on a data-processing system made up of one or more server computers. Location engine 113 maintains databases, which are described in detail below. Location engine 113 is capable of accessing the Internet.

It will be clear to those skilled in the art, after reading this disclosure, how to make and use location engine 113. Furthermore, although location engine 113 is depicted in FIG. 3 as physically distinct from wireless infrastructure 111, it will be clear to those skilled in the art, after reading this disclosure, how to make and use alternative embodiments of the present invention in which location engine 113 is wholly or partially integrated into wireless infrastructure 111.

Pressure reference 114 comprises hardware and software that continually measures the atmospheric pressure—that is, provides a measurement of barometric pressure at an outdoor location—and transmits those measurements to location engine 113. Pressure reference 114 is stationary and at a known location in geographic region 120 and known elevation, and measures barometric pressure at an outdoor location, thereby not being subject to any stack effect. In some embodiments of the present invention, pressure reference 114 is at a government or commercial-grade weather-reporting station within a pressure reference network of similar stations, while in other embodiments reference 114 is at an airport station within a pressure reference network of similar stations. In still some other embodiments, reference 114 is at a different type of station—that is, neither at an airport nor reporting the weather—within a pressure reference network of similar stations.

It will be clear to those skilled in the art, after reading this specification, how to make and use embodiments of the present invention that comprise any number of pressure references 114 within a pressure reference network that is capable of providing a representative measurement of barometric corresponding to a specified location with region 120.

Figure 2:
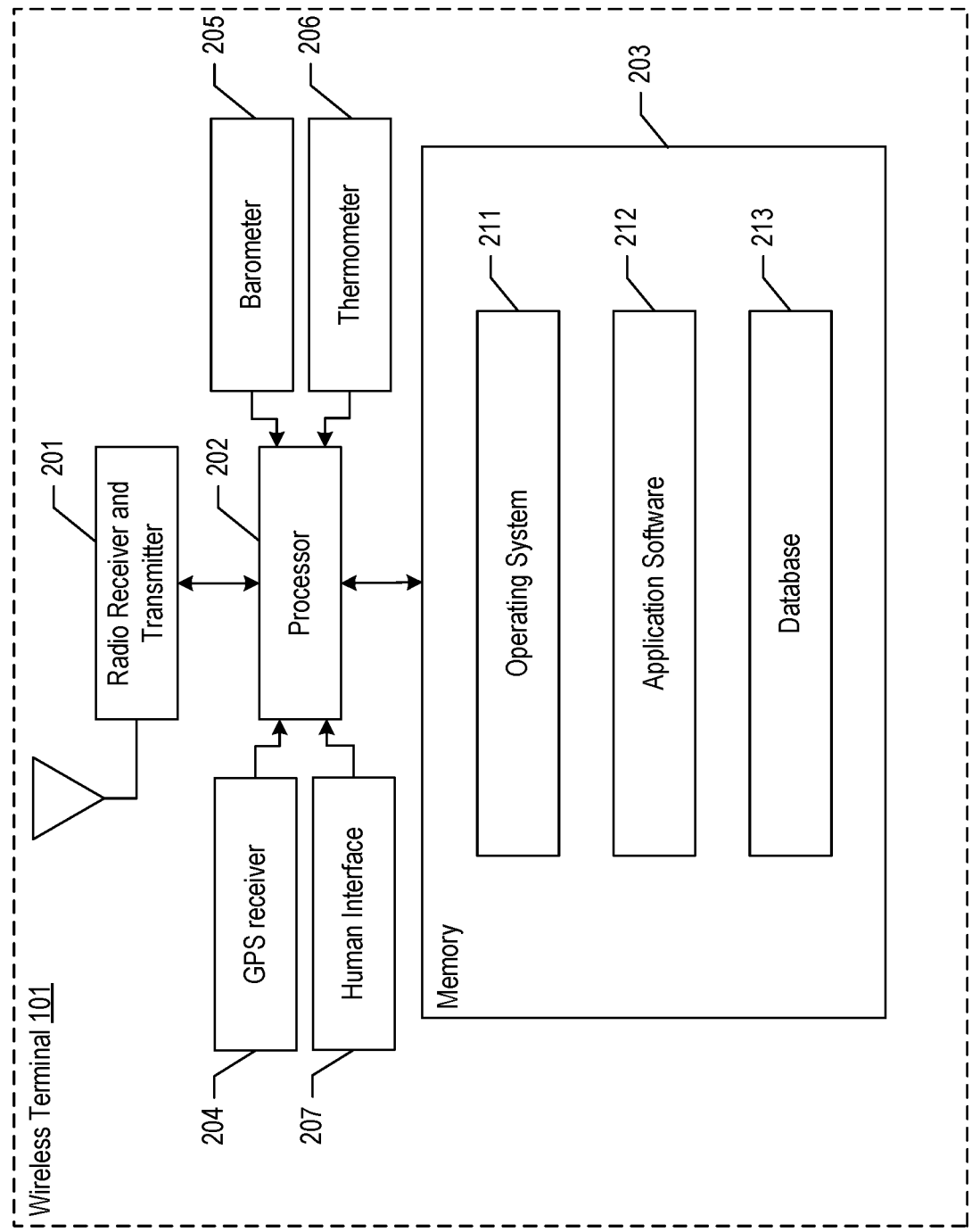
FIG. 2 depicts a block diagram of the salient components of wireless terminal 101 of telecommunications system 100.

Wireless Terminal 101—FIG. 2 depicts a block diagram of the salient components of wireless terminal 101 in accordance with the illustrative embodiment of the present invention. Wireless terminal 101 comprises: radio receiver and transmitter 201, processor 202, memory 203, GPS receiver 204, barometer 205, thermometer 206, and human interface 207, interconnected as shown. The block diagram depicted in FIG. 2 can also be considered representative of other wireless terminals.

Radio receiver and transmitter 201 comprises hardware and software that enables wireless terminal 101 to receive and analyze radio signals and to transmit radio signals. In accordance with the illustrative embodiment, wireless telecommunications service is provided to wireless terminal 101 in accordance with both the Long-Term Evolution (LTE) 4G air-interface standard of the $3^{rd}$ Generation Partnership Project ("3GPP") and the WiFi standard. After reading this disclosure, however, it will be clear to those skilled in the art how to make and use alternative embodiments of the present invention that operate in accordance with one or more other air-interface standards (e.g., a 5G standard, a standard under development, a different 4G standard, Global System Mobile "GSM," UMTS, CDMA-2000, IS-136 TDMA, IS-95 CDMA, 3G Wideband CDMA, other IEEE 802.11 or wireless LAN standard, 802.16 WiMax, Bluetooth, etc.) in one or more frequency bands. It will be clear to those skilled in the art how to make and use radio receiver and transmitter 201.

Processor 202 is hardware under the command of software stored in memory 203 that performs all of the relevant functions described below and in the accompanying figures. It will be clear to those skilled in the art how to make and use processor 202.

Memory 203 is a non-transitory, non-volatile random-access memory that holds all of the programming and data required for the operation of wireless terminal 101, and includes operating system 211, application software 212, and database 213. It will be clear to those skilled in the art how to make and use memory 203.

GPS receiver 204 is hardware and software that enables wireless terminal 101 to determine its own location. GPS receiver 204 interacts with GPS satellites in constellation 121 and receives electromagnetic signals transmitted by one or more of the satellites. It will be clear to those skilled in the art how to make and use GPS receiver 204.

Barometer 205 is a barometric sensor device and typically comprises a hardware MEMS sensor that measures the atmospheric pressure at wireless terminal 101, thereby providing barometric pressure measurements. In accordance with the illustrative embodiment, barometer 205 comprises the LSP331AP MEMS pressure sensor from ST Microelectronics and/or the Bosch BMP280 sensor, but it will be clear those skilled in the art, after reading this disclosure, how to make and use alternative embodiments of the present invention that use a different sensor to measure the atmospheric pressure.

Thermometer 206 is a hardware temperature sensor that measures the ambient temperature at wireless terminal 101. In accordance with the illustrative embodiment, thermometer 206 comprises the Bosch BMP280 sensor, which also measures temperature in addition to pressure, but it will be clear to those skilled in the art, after reading this disclosure, how to make and use alternative embodiments of the present invention that use a different sensor to measure the ambient temperature at wireless terminal 101. For example, the ADT7420 temperature sensor from Analog Devices is capable of measuring temperature. In some embodiments of the present invention, wireless terminal 101 has no thermometer, in which case the system disclosed herein can determine ambient temperature through other means.

Human interface 207 is hardware and software that enables a person to interact with wireless terminal 101. Human interface 207 comprises a display, keypad, microphone, and speaker. It will be clear to those skilled in the art how to make and use human interface 207.

Figure 3:
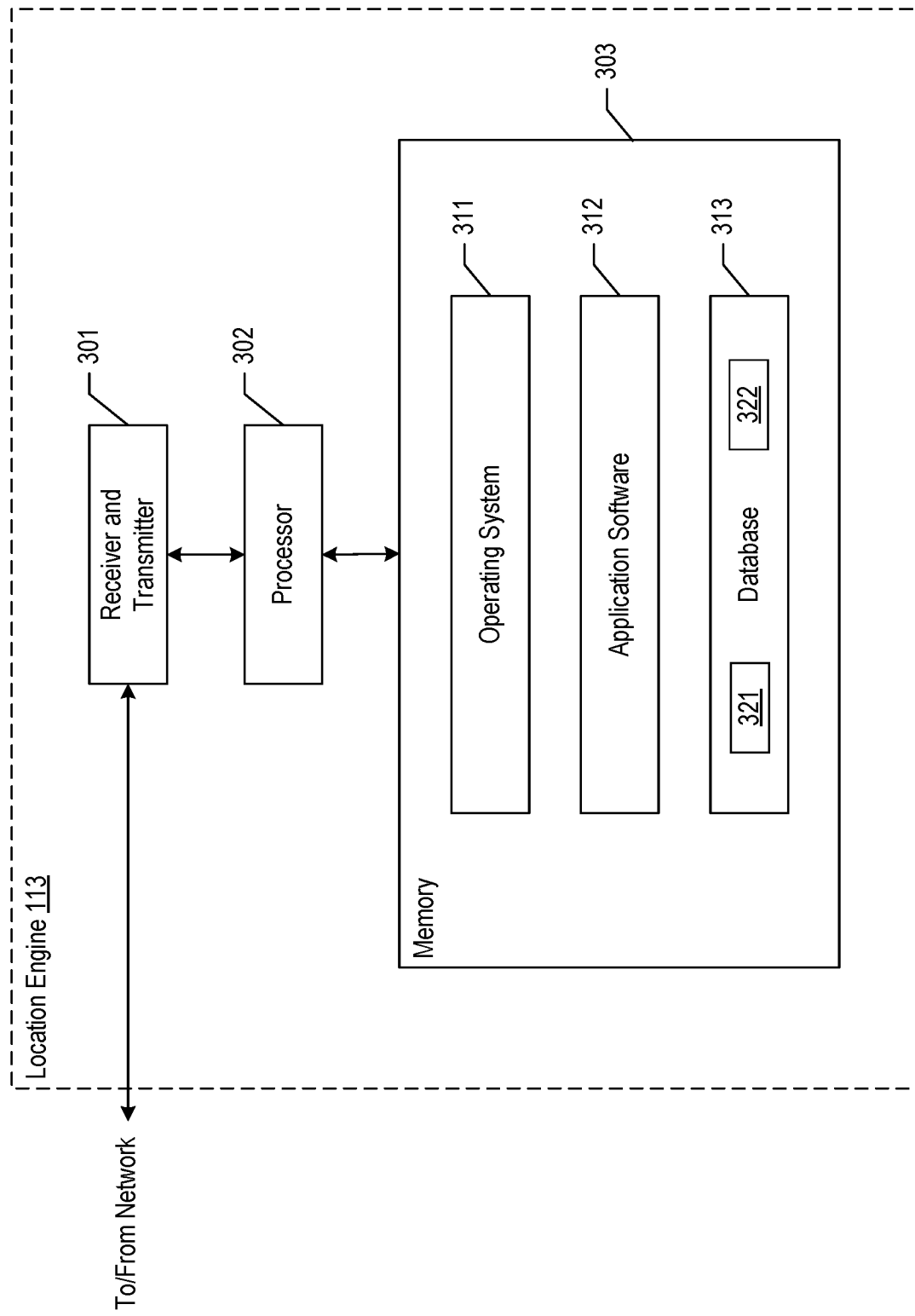
FIG. 3 depicts a block diagram of the salient components of location engine 113 of telecommunications system 100.

Location engine 113—FIG. 3 depicts a block diagram of the salient components of location engine 113 in accordance with the illustrative embodiment.

Location engine 113 comprises: receiver and transmitter 301, processor 302, and memory 303, which are interconnected as shown.

Receiver and transmitter 301 enable location engine 113 to transmit to and receive from wireless terminal 101, wireless infrastructure 111, location-based application server 112, pressure reference 114, cellular base stations 103-1, 103-2, and 103-3, Wi-Fi base stations 104-1 and 104-2, and the Internet. It will be clear to those skilled in the art how to make and use receiver and transmitter 301.

Figure 4:
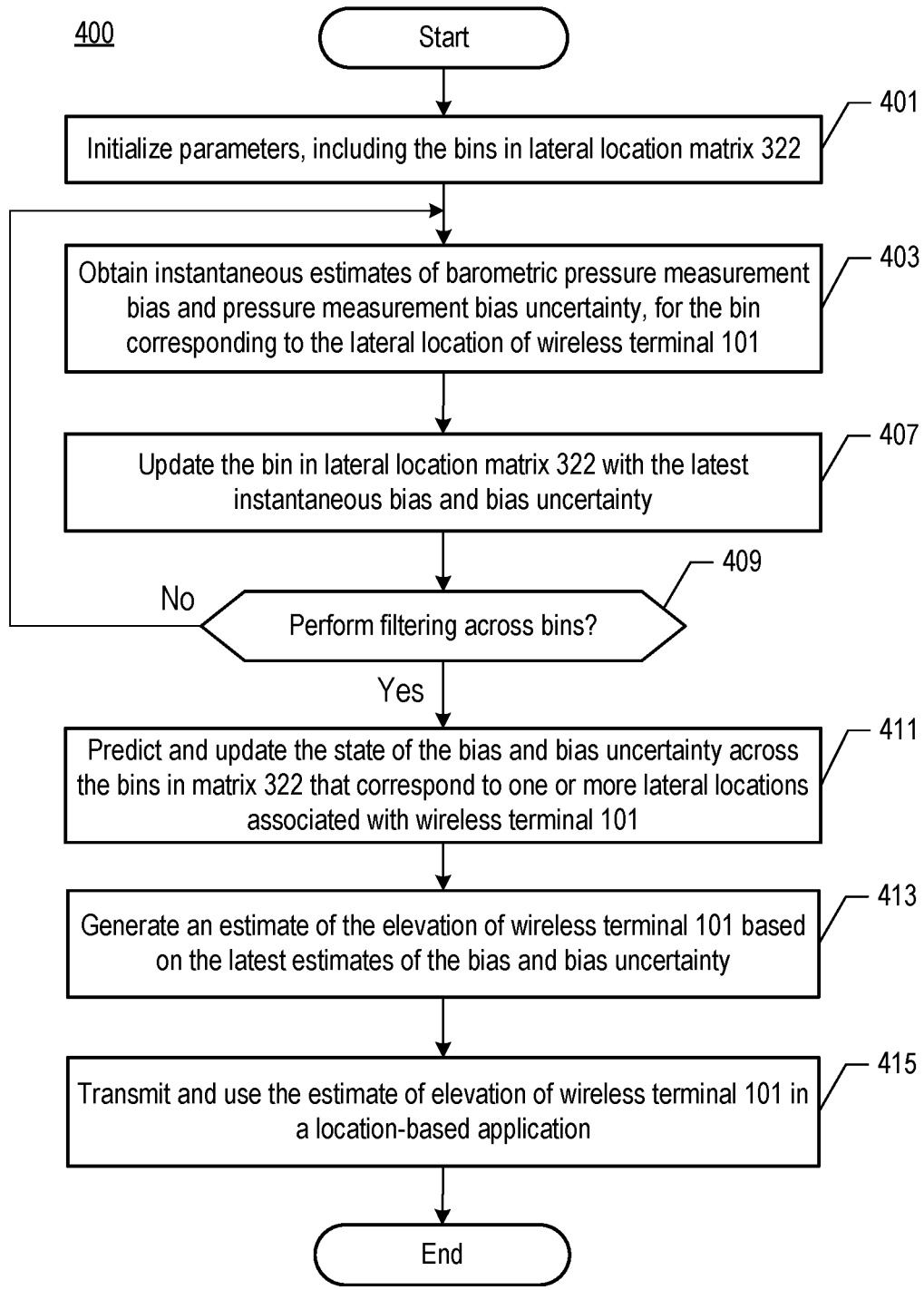
FIG. 4 depicts a flowchart of the salient processes performed as part of method 400 in accordance with the illustrative embodiment of the present invention.
Figure 17:
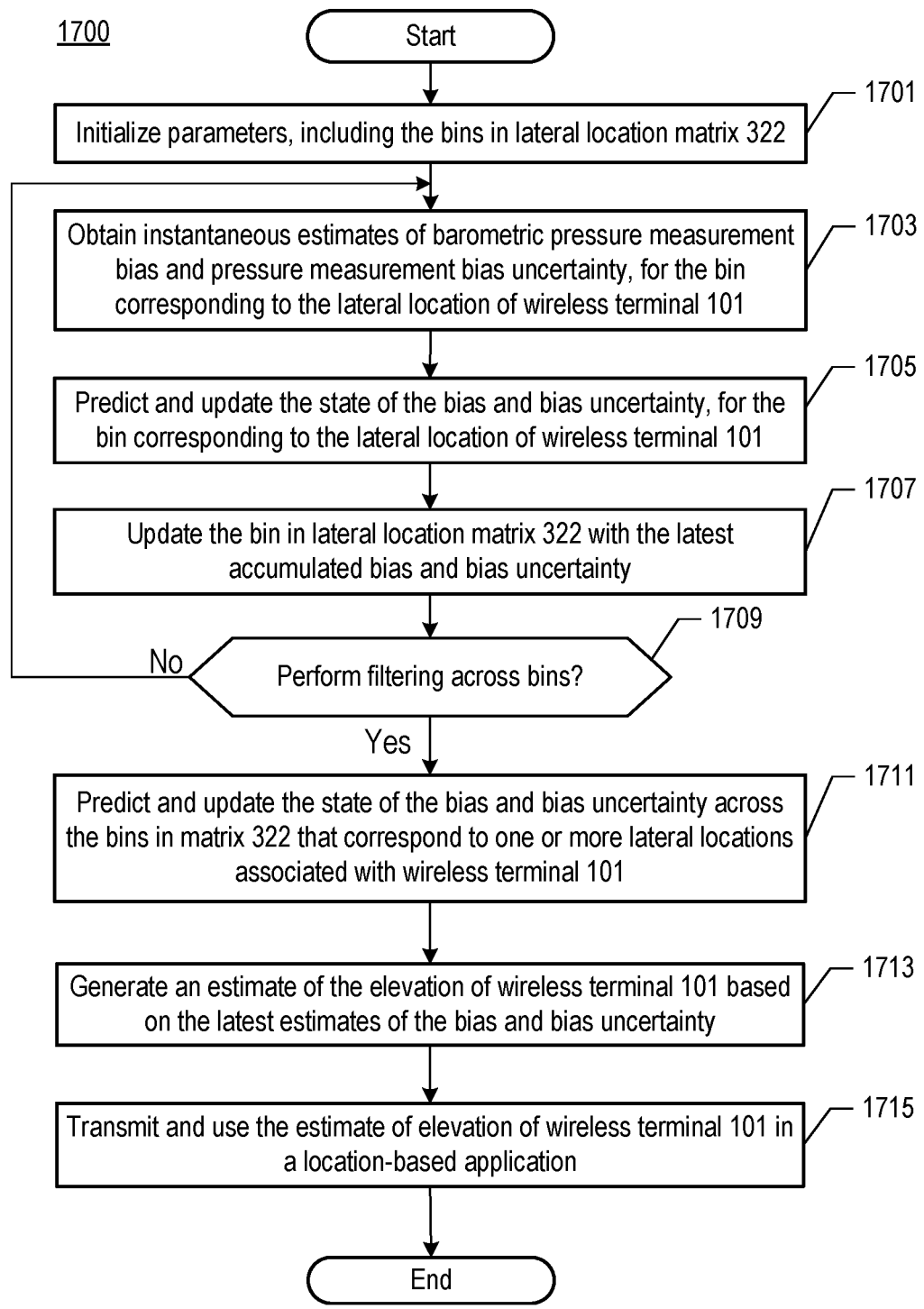
FIG. 17 depicts a flowchart of the salient processes performed as part of method 1700 in accordance with the illustrative embodiment of the present invention.

Processor 302 is a general-purpose processor that can execute an operating system and the application software that performs at least some of the operations disclosed herein, including, but not limited to, those in FIGS. 4 and 17. Processor 302 is also capable of populating, amending, using, and managing GIS database 321 and lateral location matrix 322, as described in detail below and in the accompanying figures. It will be clear to those skilled in the art how to make and use processor 302.

In general, GIS database 321 contains information for geographic region 120, including without limitation the physical characteristics of all of the structures in geographic region 120 (e.g., one or more exterior walls of each building, etc.), as described below. It will be clear to those skilled in the art, after reading this specification, how to make and use GIS database 321.

In general, lateral location matrix 322, which is a multi-dimensional array, contains information based on one or more measurements made by wireless terminal 101, as described below. It will be clear to those skilled in the art, after reading this specification, how to make and use matrix 322.

Memory 303 is a non-transitory, non-volatile memory that stores:
  i. operating system 311, and
  ii. application software 312, and
  iii. GIS database 321 in database 313, and
  iv. matrix 322 in database 313.
It will be clear to those skilled in the art how to make and use memory 303.

Operation of the illustrative Embodiment—FIG. 4 depicts a flowchart of the salient processes performed as part of method 400 in accordance with the illustrative embodiment of the present invention. It will be clear to those having ordinary skill in the art, after reading the present disclosure, how to make and use alternative embodiments of method 400, and also of the other methods disclosed in this specification, wherein the recited operations sub-operations, and messages are differently sequenced, grouped, or sub-divided—all within the scope of the present disclosure. It will also be clear to those skilled in the art, after reading the present disclosure, how to make and use alternative embodiments of the disclosed methods wherein some of the described operations, sub-operations, and messages are optional, or are omitted.

It will also be clear to those skilled in the art, after reading the present disclosure, how to make and use alternative embodiments of the disclosed methods wherein some of the disclosed operations are performed by other elements and/or systems. For example and without limitation, at least some of the operations disclosed as being performed by location engine 113 can be performed by one or more wireless terminals (e.g., terminal 101, a different terminal than terminal 101, etc.).

In accordance with the illustrative embodiment, location engine 113 performs Kalman filtering both:
  i. within individual lateral locations visited by wireless terminal 101, as represented by the individual bins corresponding to lateral locations in matrix 322, and
  ii. across the different, individually-filtered lateral locations visited by wireless terminal 101.

Both of the foregoing steps are described below and in regard to method 1700 depicted in FIG. 17. For pedagogical reasons, however, only the second step of the Kalman filtering occurring across the different, individually-filtered lateral locations will be described initially, and as part of method 400. In method 400, instead of filtering within each bin, location engine 113 maintains an instantaneous estimate of measurement bias and bias uncertainty within each bin visited by wireless terminal 101. At some point, location engine 113 applies the Kalman filtering to the stored instantaneous estimates across multiple bins.

Method 400 features location engine 113 using the most recent instantaneous estimate of barometric pressure measurement bias and corresponding bias uncertainty for a given lateral location x-y and for a given wireless terminal, illustratively wireless terminal 101. One reason for using the most recent instantaneous estimate for a given lateral location, in contrast to using an older instantaneous estimate, is that the barometric pressure measurement bias tends to settle due to drift when a wireless terminal has been at a particular location (e.g., within a room, etc.) for more than a certain amount of time. Performing the Kalman filtering based on such measurements results, at least in some cases, results in a better estimation of pressure measurement bias than if settling had not been allowed to occur.

In some alternative embodiments of the present invention, location engine 113 uses the first available instantaneous estimate of barometric pressure measurement bias and corresponding bias uncertainty, instead of the most recent instantaneous estimate. One reason for using the first estimate set obtained for a given lateral location is so that Kalman filtering can be done on the fly as the instantaneous estimate becomes available for a bin corresponding to a given lateral location. As a result, matrix 322 only has to store an indication of whether the Kalman filtering has already used an estimate set for a given lateral location, or not. Such an indication can be a Boolean indication (e.g., "1" or "0", "yes" or "no", "true" or "false", etc.) for a given lateral location, for example and without limitation. This can reduce the processing and/or memory requirements.

Unless otherwise indicated, lateral location matrix 322 and the operations pertaining to matrix 322 are dedicated to a single wireless terminal—illustratively, wireless terminal 101. As those who are skilled in the art will appreciate after reading this specification, location engine 113 can track additional wireless terminals through their own lateral location matrices and concurrently determine pressure measurement biases and uncertainties for said terminals using the additional matrices and operations described herein.

In accordance with operation 401, GIS database 321 and lateral location matrix 322 are constructed and stored in memory 303 of location engine 113. Operation 401 is described in detail below and in regard to FIG. 5.

In accordance with operation 403, location engine 113 obtains, for a given lateral location $x_i$-$y_i$, an estimate set comprising (i) an instantaneous estimate of the barometric pressure measurement bias of wireless terminal 101 and (ii) an instantaneous estimate of a corresponding pressure measurement bias uncertainty. Operation 403 is described in detail below and in regard to FIG. 10.

In accordance with operation 407, location engine 113 updates bin($x_i$,$y_i$) in lateral location matrix 322 with the instantaneous estimate of bias and bias uncertainty obtained at the current iteration i of operation 403 for the lateral location $x_i$-$y_i$ of wireless terminal 101.

In accordance with operation 409, location engine 113 determines whether it is to perform filtering across one or more bins corresponding to one or more lateral locations, such as the Kalman filtering of the illustrative embodiment. For example and without limitation, the location engine can perform filtering once N bins (N equals at least 50, at least 100, at least 200, etc.) in matrix 322 have instantaneous estimates stored—that is, N different lateral locations have instantaneous estimates available. As another example, location engine 113 can perform filtering once a predetermined period of time has passed since the location engine first started tracking wireless terminal 101 via matrix 322. In some embodiments of the present invention, location engine 113 can perform filtering on demand.

If filtering is to be performed, then control of task execution proceeds to operation 411. Otherwise, control of task execution proceeds back to operation 403 in order to continue to maintain the latest instantaneous estimates of bias and uncertainty for each lateral location visited by wireless terminal 101.

In accordance with operation 411, location engine 113 performs the Kalman filtering across the bins. In doing so, location engine 113 predicts and updates the filter state of the bias and bias uncertainty, based on the data points stored in matrix 322 that corresponds to at least some of the lateral locations visited by wireless terminal 101. As part of operation 411, location engine 113 determines an enhanced estimate, as distinguished from an instantaneous estimate, of the measurement bias and bias uncertainty of wireless terminal 101. Operation 411 is described in detail below and in regard to FIG. 14.

As those who are skilled in the art will appreciate after reading this specification, in some embodiments of the present invention, the Kalman filtering can be done on at least some of the instantaneous bias and uncertainty estimates as they are generated at operation 403 and without the use of matrix 322. As those who are skilled in the art will appreciate after reading this specification, in some embodiments of the present invention, a different type of filtering or averaging than the Kalman filtering of the illustrative embodiment can be performed at operation 411.

In accordance with operation 413, location engine 113 generates an estimate of the current elevation of wireless terminal 101 based on the latest enhanced estimates of the pressure measurement bias and the bias uncertainty generated in accordance with operation 411, and on a measurement of barometric pressure made by the terminal and coinciding with terminal's current elevation and lateral location. Operation 413 is described in detail below and in regard to FIG. 18.

In accordance with operation 415, location engine 113 transmits:
   i. the enhanced estimate of measurement bias and/or bias uncertainty generated in accordance with operation 411, and/or
   ii. the estimate of the elevation of wireless terminal 101 generated in accordance with operation 413, and/or
   iii. an estimate of the lateral location of wireless terminal 101, to location-based application server 112 and/or to wireless terminal 101 for use in a location-based application. In some embodiments of the present invention, location engine 113 displays (e.g., on a display, etc.) the estimate of lateral location and/or estimate of bias/bias uncertainty and/or estimate of elevation, instead of or in addition to transmitting them. It will be clear to those skilled in the art how to make and use embodiments of the present invention that perform operation 415.

After operation 415 is completed, location engine 113 can repeat the operations depicted in FIG. 4.

Figure 5:
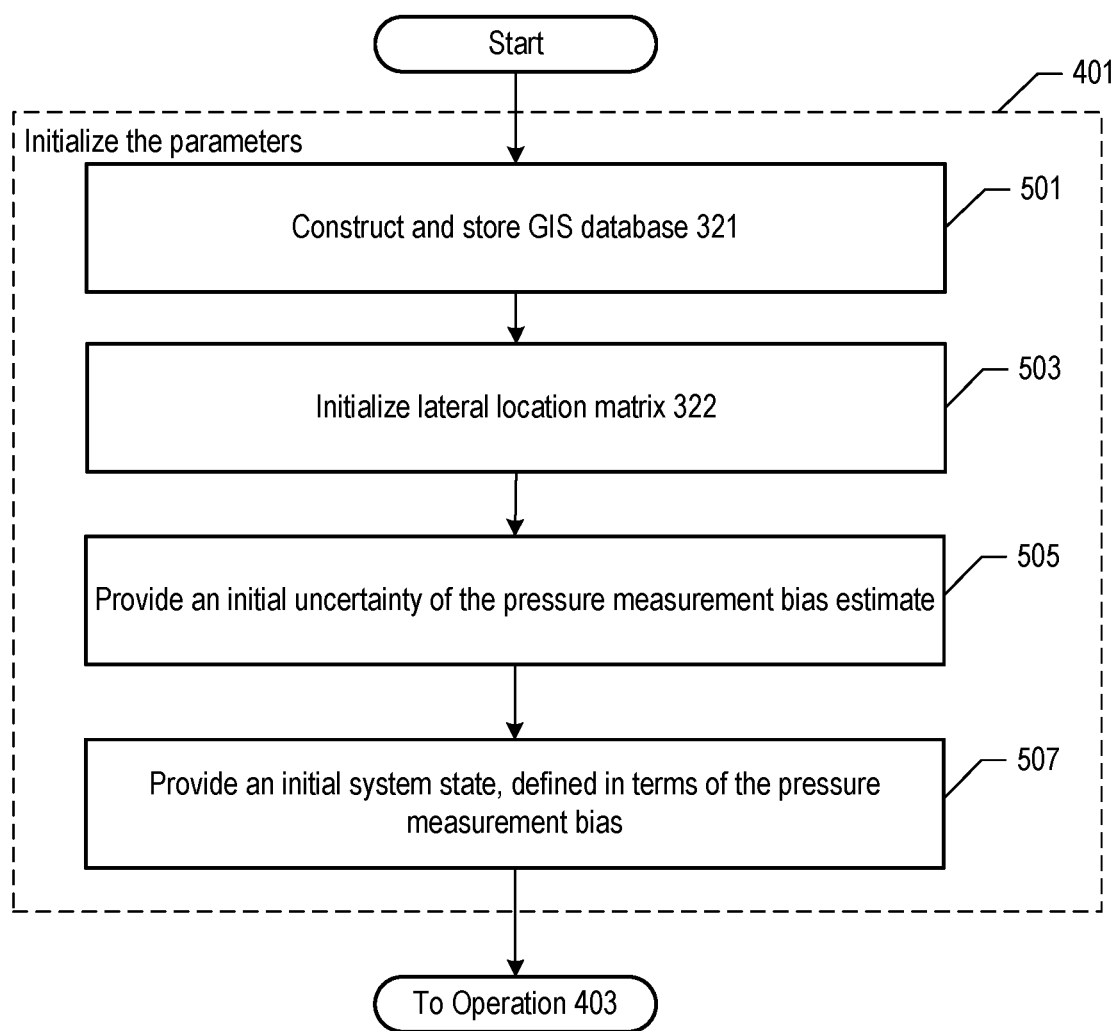
FIG. 5 depicts a flowchart of the salient processes performed in accordance with operation 401 of method 400.

Operation 401: Initialize the parameters—FIG. 5 depicts a flowchart of the salient processes performed in accordance with operation 401.

Figure 6:
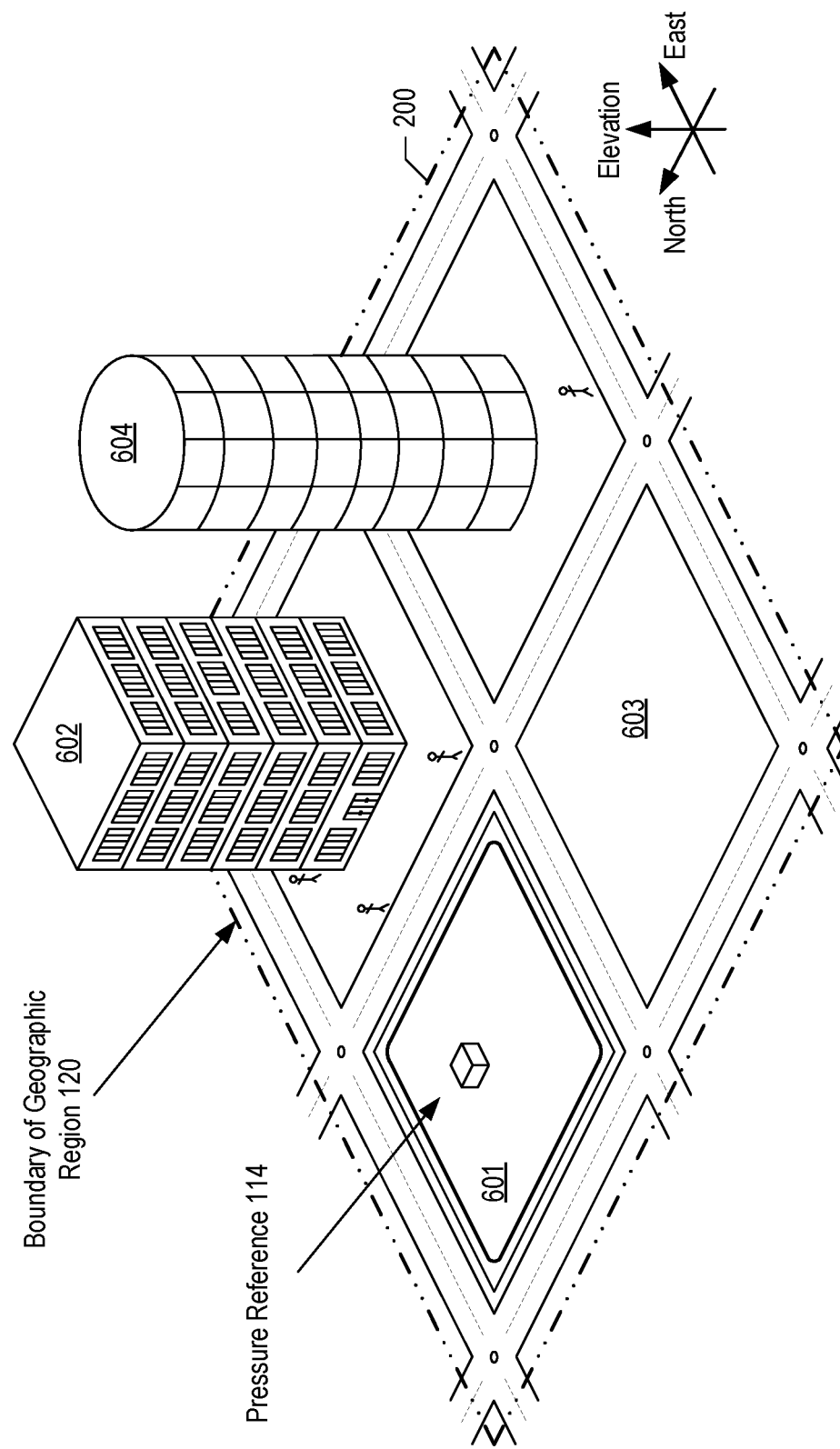
FIG. 6 depicts an isometric drawing of geographic region 120 in accordance with the illustrative embodiment of the present invention.

At operation 501, GIS database 321 is constructed and stored in memory 303 of location engine 113. As part of operation 501, geographic region 120 is delimited and surveyed. FIG. 6 depicts a detailed map that is made of geographic region 120, which spans approximately four city blocks and comprises, among other things, park 601, boxy building 602, empty lot 603, and cylindrical building 604, and pressure reference 114. It will be clear to those skilled in the art, after reading this disclosure, how to make and use alternative embodiments of the present invention that comprise any area, any geographic features, and any number, size, height, and shape of structures.

In accordance with the illustrative embodiment, geographic region 120 is flat, level, and at an elevation of 1000 meters, a known elevation. It will be clear to those skilled in the art, however, after reading this disclosure, how to make and use alternative embodiments of the present invention in which geographic region 120 is not flat, not level, and/or is at a different elevation.

In accordance with the illustrative embodiment, the height of boxy building 602 is 128 meters and the height of cylindrical building 604 is 140 meters. In other words, the elevation of boxy building 602 is 1128 meters and the elevation of cylindrical building 604 is 1140 meters. It will be clear to those skilled in the art, after reading this disclosure, how to make and use alternative embodiments of the present invention in which the structures have any height.

Figure 7:
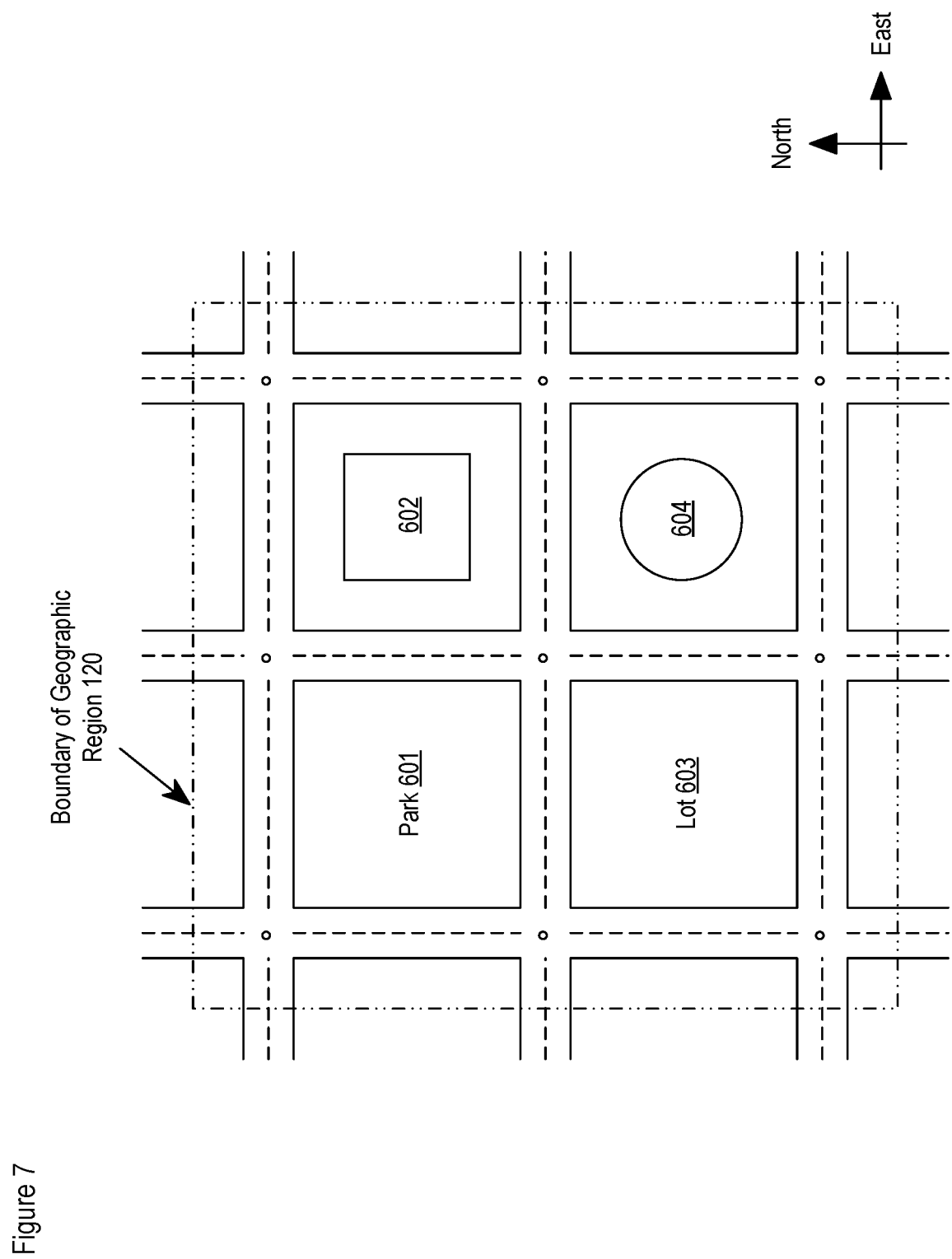
FIG. 7 a detailed map of the ground level of geographic region 120.

In accordance with the illustrative embodiment, geographic region 120 is square and comprises approximately four city blocks of an urban environment. It will be clear to those skilled in the art however, after reading this disclosure, how to make and use alternative embodiments of the present invention in which geographic region 120 has any area of any shape and any population density and development. As part of operation 501, a detailed map of the ground level of geographic region 120 is made, as shown in FIG. 7.

Figure 8:
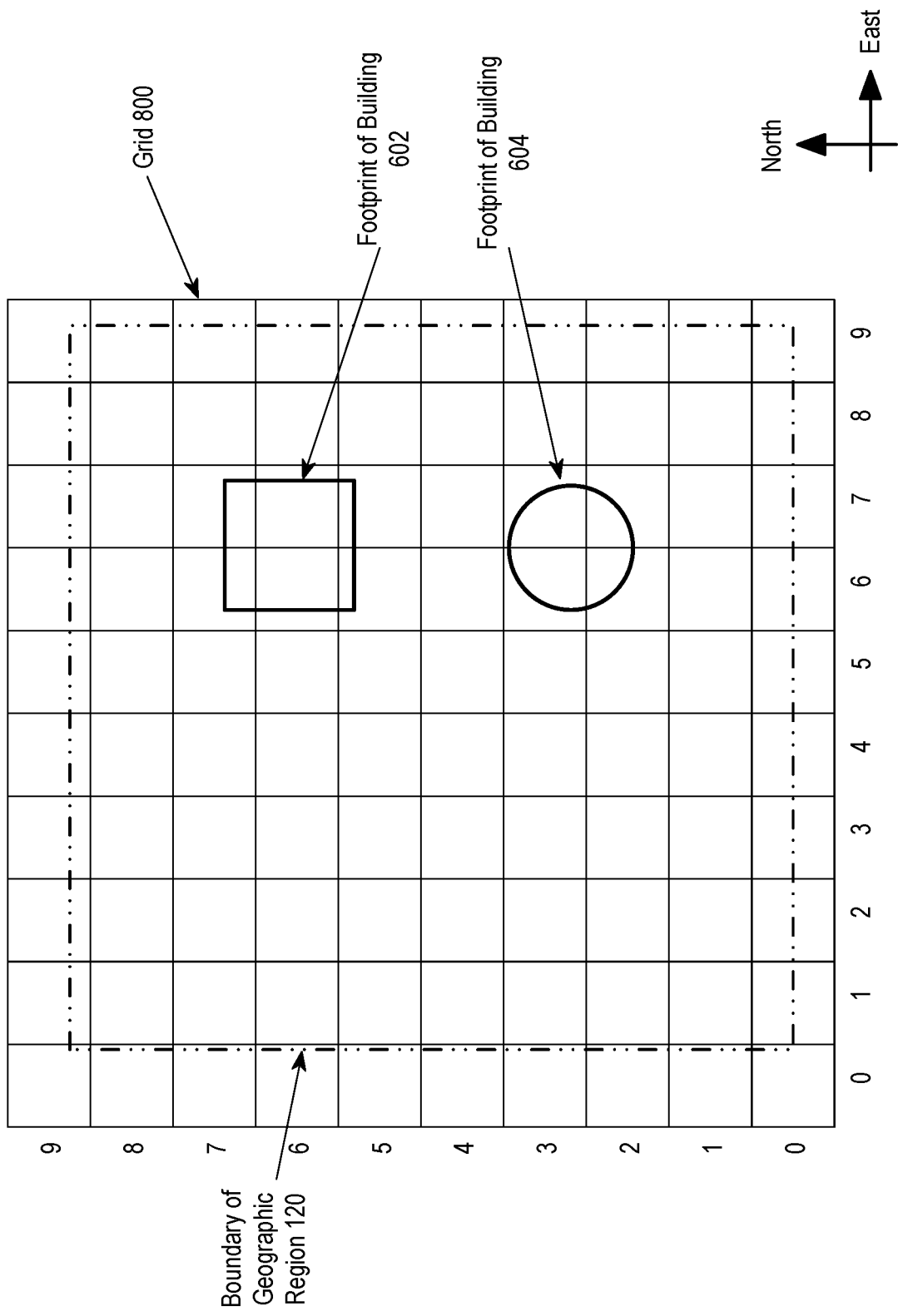
FIG. 8 depicts geographic region 120 divided into a 10-by-10 grid.

As part of operation 501, grid 800 is overlaid onto geographic region 120 as shown in FIG. 8. Grid 800 is a 10-tile by 10-tile grid that partitions geographic region 120 into a plurality of possible lateral locations of wireless terminal 101. FIG. 8 also depicts the relationship of the footprints of boxy building 602 and cylindrical building 604 with respect to the grid.

Although the illustrative embodiment comprises 100 grid tiles of square shape, it will be clear to those skilled in the art how to make and use alternative embodiments of the present invention that comprise any number of possible lateral location areas of any shape. See for example and without limitation, U.S. Pat. No. 7,753,278, which is incorporated by reference.

Figure 9:
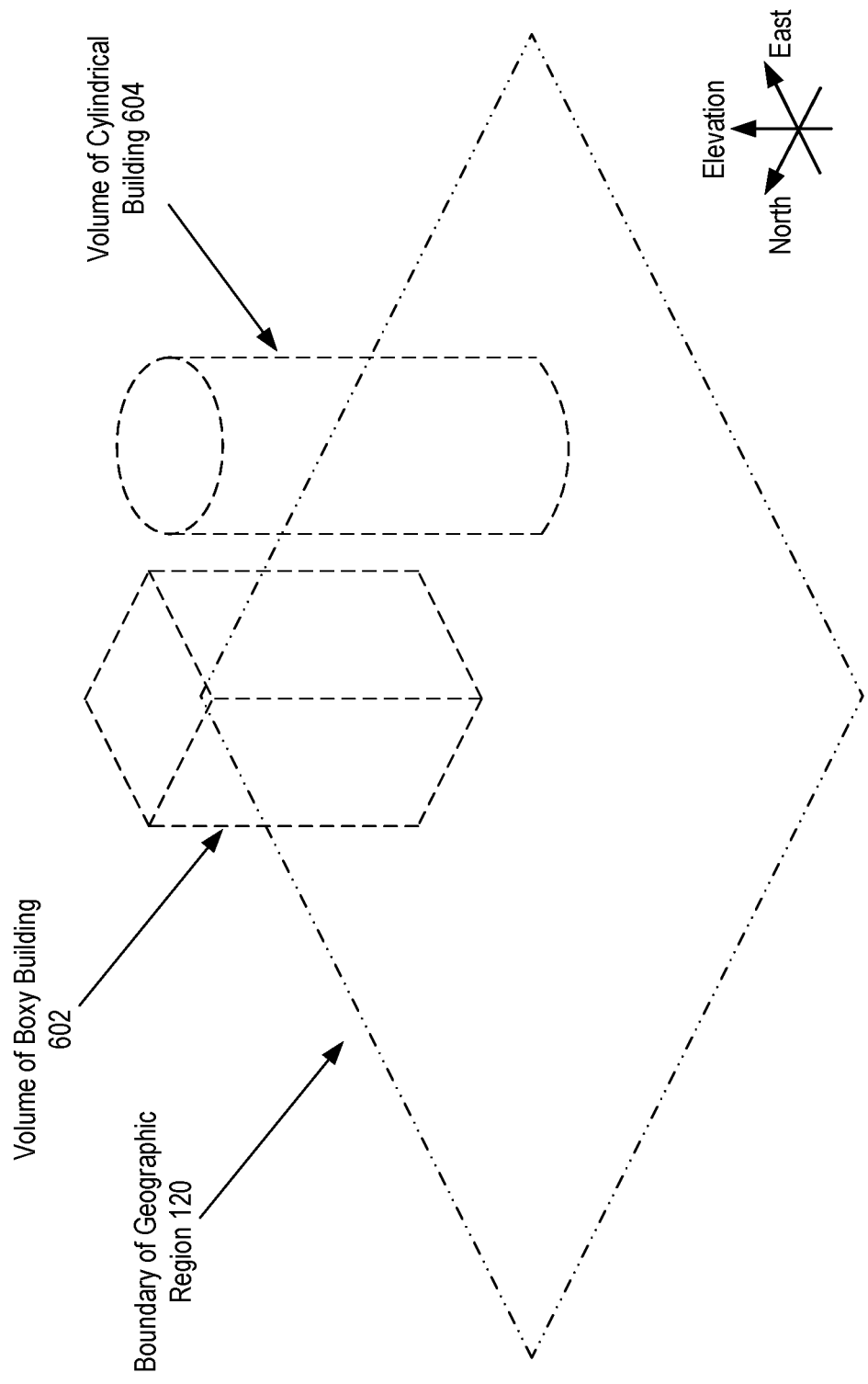
FIG. 9 depicts a three-dimensional survey of geographic region 120.

In accordance with the illustrative embodiment, as part of operation 501, the coordinate positions of the various features of one or more objects (e.g., buildings, structures, etc.) in geographic region 120 are determined and stored in GIS database 321. The positions of one or more features of the objects can be determined by referencing the three-dimensional survey of geographic region 120, which is depicted in FIG. 9. In some embodiments of the present invention, the objects can be represented in a different way (e.g., vector-based, etc.).

At operation 503, lateral location matrix 322 is initialized in memory 303 of location engine 113 for each wireless terminal of interest, such as wireless terminal 101. Matrix 322 corresponds to grid 800 depicted in FIG. 8. Each grid tile in the grid corresponds to each different cell, or "bin," of information stored in matrix 322 in memory 303, into which one or more values that correspond to the lateral location represented by the grid tile are to be stored, as described in the figures below.

In accordance with the illustrative embodiment, location engine 113 uses matrix 322 to store the most recent instantaneous estimate as in method 400, or accumulated estimate as in method 1700, of pressure measurement bias and bias uncertainty, for each lateral location x-y of wireless terminal 101. As those who are skilled in the art will appreciate, however, after reading this specification, location engine 113 can use matrix 322 to store other values in some other embodiments. For example and without limitation, matrix 322 can be used to store a Boolean indication (e.g., "1" or "0", "yes" or "no", "true" or "false", etc.) for a given lateral location x-y, or enhanced estimates of measurement bias and bias uncertainty for a given lateral location x-y, or the first or oldest instantaneous estimates of measurement bias and bias uncertainty for a given lateral location x-y, or something else, in any combination. Additional Information on how location engine 113 uses matrix 322 is described below and in regard to FIG. 14.

For pedagogical purposes, each bin in matrix 322 represents a grid-square area of 100 meters in the x direction by 100 meters in the y direction. As those who are skilled in the art will appreciate, however, the dimensions represented by each bin can be different than 100 meters by 100 meters. For example and without limitation, a bin corresponding to a grid tile can represent (i) dimensions of 50 meters by 50 meters (i.e., squares), (ii) dimensions of 50 meters by 100 meters (i.e., non-square rectangles), (iii) two or more different sets of dimensions across bins, (iv) dimensions corresponding to a different shape than a square or non-square rectangle, and so on. In some embodiments of the present invention, one or more characteristics of matrix 322 (e.g., bin size, bin dimensions, matrix size, matrix dimensions, etc.) can be based on guaranteeing a minimum distance between two or more lateral locations that are represented in the Kalman filtering disclosed herein, in order to improve the performance such as by enforcing a zero-mean Gaussian distribution in certain error components.

In some embodiments of the present invention, matrix 322 is defined as having a third dimension corresponding to time. The granularity between time bins in matrix 322 can be based, for example and without limitation, on a characteristic of the GPS system, such as the satellite orbit determining a minimum time between successive measurements that are sufficiently separated in time (e.g., 15 minutes between bins, etc.), in order to improve the performance. In some embodiments of the present invention, Kalman filtering can be performed on data points (e.g., the estimates of bias and uncertainty, etc.) stored across a time dimension of matrix 322.

As those who are skilled in the art will appreciate after reading this specification, matrix 322 can have additional physical dimensions as well, beyond the x and y dimensions. For example and without limitation, matrix 322 can have a spatial dimension that corresponds to the z dimension. In some embodiments of the present invention, Kalman filtering can be performed on data points (e.g., the estimates of bias and uncertainty, etc.) stored across a z dimension of matrix 322.

Figure 15:
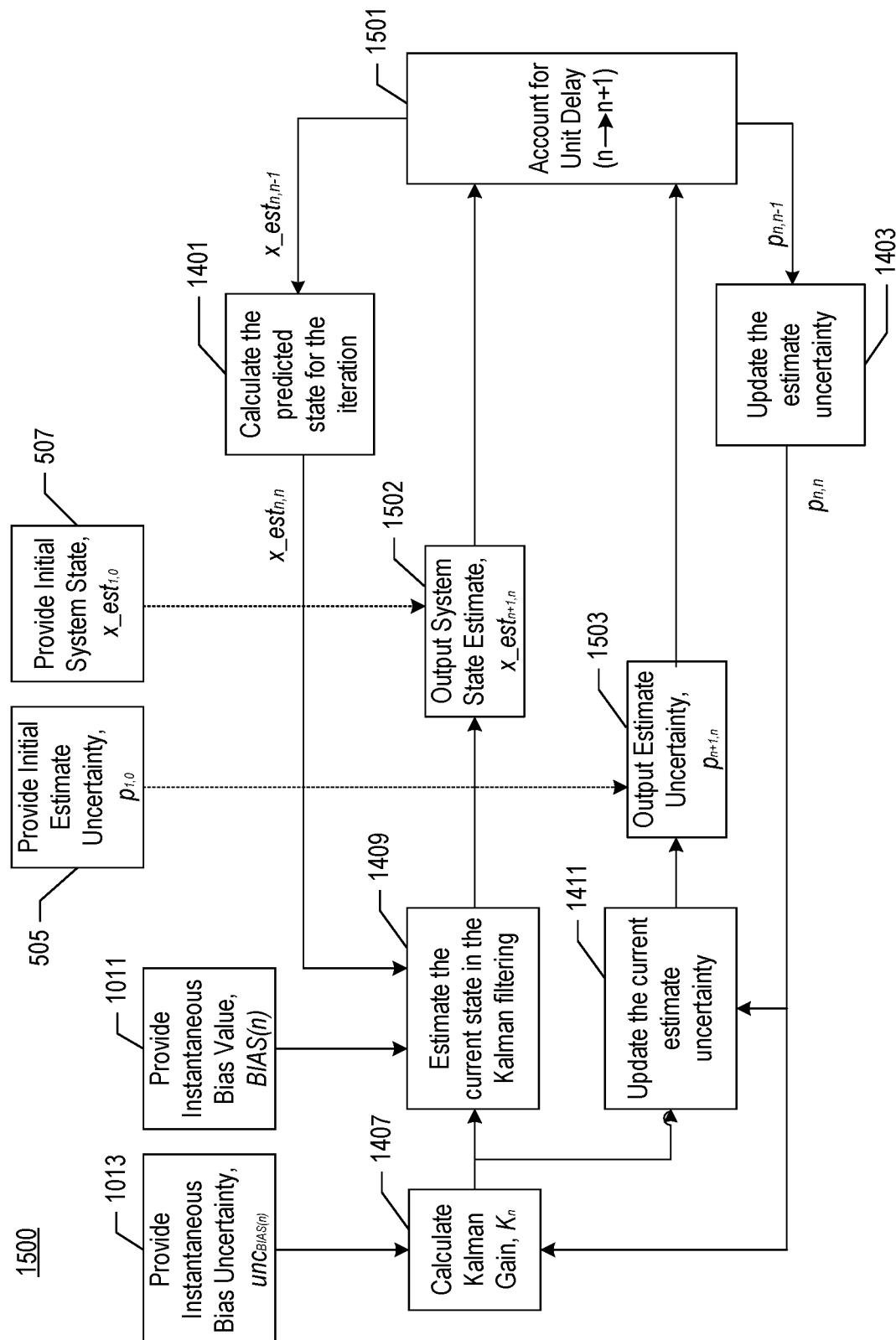
FIG. 15 depicts a diagram of dynamic model 1500 in the Kalman filtering of the illustrative embodiment.

At operation 505, location engine 113 stores an initial estimate uncertainty, as depicted in FIG. 15.

At operation 507, location engine 113 stores an initial system state, as depicted in FIG. 15.

Figure 10:
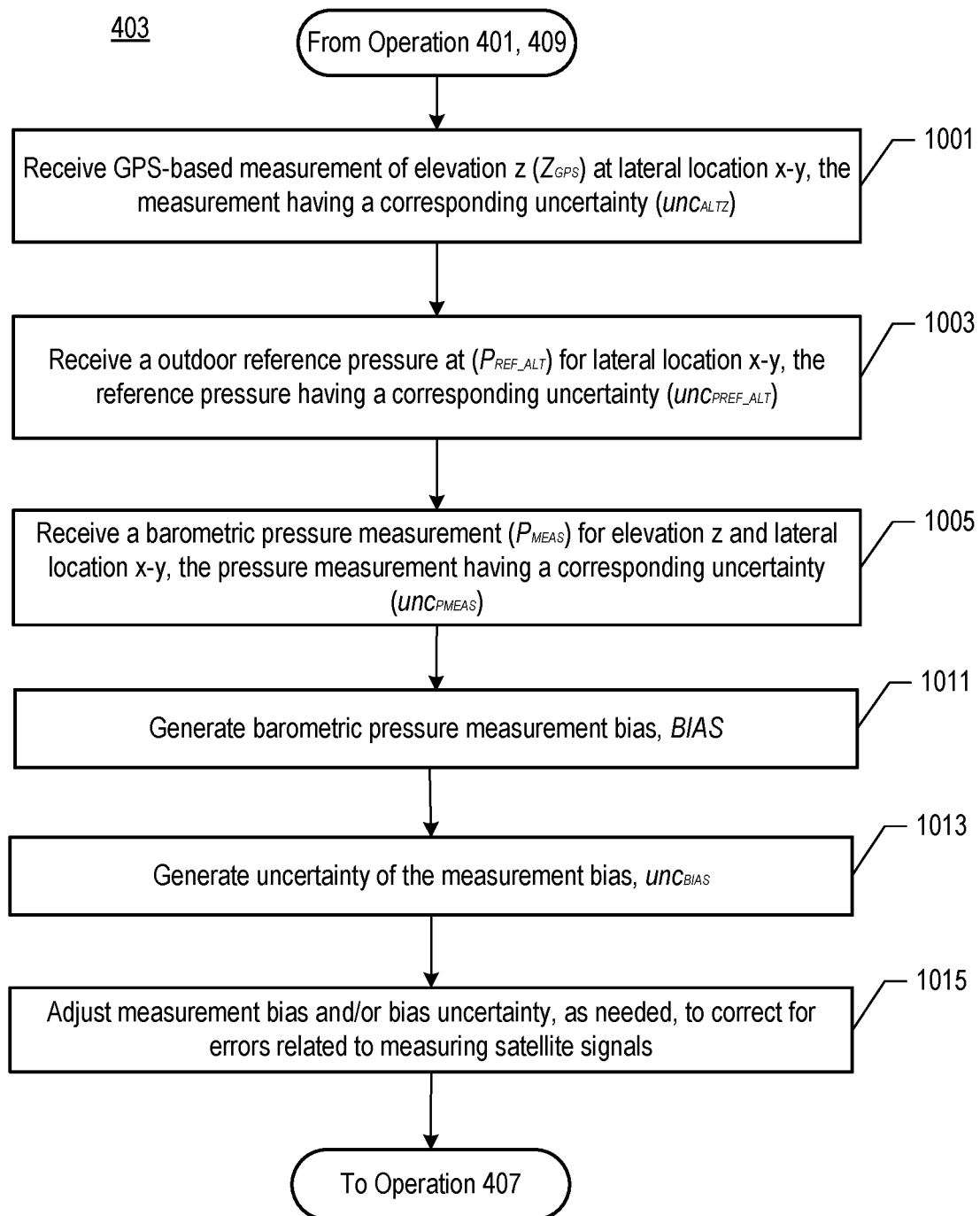
FIG. 10 depicts a flowchart of the salient processes performed in accordance with operation 403 of method 400.

Operation 403: Obtain Barometric Pressure Measurement Bias and Uncertainty—FIG. 10 depicts a flowchart of the salient processes performed in accordance with operation 403. Unless otherwise indicated, the current lateral location x-y of wireless terminal 101 determines the current bin that is being used in matrix 322, for the processing in operation 403 and elsewhere.

In accordance with operation 1001, location engine 113 receives, from wireless terminal 101, a GPS-based measurement of elevation z, referred to as $Z_{GPS}$, at lateral location x-y. In some embodiments, lateral location x-y is also GPS-based and provided by terminal 101, while in some other embodiments, lateral location x-y is ascertained by other means. The lateral location of "x" and "y" can represent the area within a grid tile of grid 800 that is associated with respective latitude and longitude ("lat/lon") of wireless terminal 101, or longitude and latitude. In some embodiments of the present invention, location engine 113 also receives a corresponding uncertainty for $Z_{GPS}$, referred to as $unc_{ALTZ}$. Operation 1001 is described below and in regard to FIG. 11.

In accordance with operation 1003, location engine 113 receives, from pressure reference 114 or from a pressure reference network that includes reference 114, an outdoor reference pressure referred to as $P_{REF\_ALT}$, for lateral location x-y. In some embodiments of the present invention, location engine 113 also receives a corresponding uncertainty for $P_{REF\_ALT}$, referred to as $unc_{PREF\_ALT}$. Operation 1003 is described below and in regard to FIG. 12. $P_{REF\_ALT}$ corresponds to a reference elevation, which is not necessarily the same elevation as $Z_{GPS}$.

In some embodiments of the present invention, location engine 113 also receives, from reference 114 or from the network that includes reference 114, an outdoor reference temperature, $T_{REF\_ALT}$, for lateral location x-y, and having an uncertainty $unc_{TREF\_ALT}$. $T_{REF\_ALT}$ corresponds to the same reference elevation as $P_{REF\_ALT}$.

In accordance with operation 1005, location engine 113 receives from wireless terminal 101 a barometric pressure measurement, $P_{MEAS}$, for elevation z ($Z_{GPS}$) and lateral location x-y. The barometric pressure measurement, $P_{MEAS}$, is representative of elevation z and lateral location x-y. For example, $P_{MEAS}$ can be obtained by wireless terminal 101 while at elevation z and lateral location x-y. In some embodiments of the present invention, location engine 113 also receives a corresponding uncertainty for $P_{MEAS}$, referred to as $unc_{PMEAS}$. Operation 1005 is described below and in regard to FIG. 13.

In accordance with operation 1011, location engine 113 generates an instantaneous estimate—that is, a relatively coarse estimate at a particular instant—of the barometric pressure measurement bias, BIAS. BIAS is based on the barometric pressure measurement, $P_{MEAS}$, and a reference pressure at the elevation of wireless terminal 101, $P_{REF\_ADJ}$. In accordance with the illustrative embodiment, BIAS is equal to the difference between the barometric pressure measurement, $P_{MEAS}$, and a reference pressure at the elevation of wireless terminal 101, $P_{REF\_ADJ}$. For example, BIAS can be calculated according to:

$$BIAS = P_{MEAS} - P_{REF\_ADJ}, \quad (Eq. 2)$$

wherein:
$P_{MEAS}$ is the barometric pressure measurement, and
$P_{REF\_ADJ}$ is the reference pressure at the elevation of wireless terminal 101.

The elevation of wireless terminal 101 is equal to, or is at least based on, $Z_{GPS}$. $P_{REF\_ADJ}$ is converted from the outdoor reference pressure, $P_{REF\_ALT}$, and is also based on the elevation of wireless terminal 101, the reference elevation, and outdoor reference temperature $T_{REF\_ALT}$, as are known in the art.

In accordance with operation 1013, location engine 113 generates, for BIAS, a corresponding instantaneous estimate of the bias uncertainty, $unc_{BIAS}$, according to:

$$unc_{BIAS} = [(unc_{ALTZ})^2 + (unc_{PREF\_ALT})^2 + (unc_{TREF\_ALT})^2 + (unc_{PMEAS})^2]^{1/2}, \quad (Eq. 3)$$

wherein:
$unc_{ALTZ}$ is the uncertainty for $Z_{GPS}$,
$unc_{PREF\_ALT}$ is the uncertainty for $P_{REF\_ALT}$,
$unc_{TREF\_ALT}$ is the uncertainty for $T_{PREF\_ALT}$, and
$unc_{PMEAS}$ is the uncertainty for $P_{MEAS}$.

In some embodiments of the present invention, some, but not all, of the foregoing uncertainty components are used as part of the calculation of the uncertainty estimate. In some other embodiments, one or more additional uncertainty components are used as part of the calculation of the uncertainty estimate.

In accordance with operation 1015, in order to correct for errors related to wireless terminal 101 measuring satellite signals, location engine 113 adjusts, as needed, the estimate of bias generated at operation 1011, or the estimate of bias uncertainty generated at operation 1013, or both. An adjustment might be required because, in certain operational situations, a GPS-based measurement ($Z_{GPS}$) of wireless terminal 101's elevation z can be significantly in error, even though the corresponding, calculated uncertainty suggests otherwise. This type of error originates from the wireless terminal using incorrect information, such as information that describes the satellite constellation, in order to make the GPS measurements. The error can occur even if the GPS measurements that are made by the wireless terminal, and that are then used to generate an instantaneous estimate of pressure measurement bias and bias uncertainty, are selected carefully, such as for the purpose of enforcing a zero-mean Gaussian distribution.

For example, the precise orbital information for a transmitting GPS satellite—that is, the ephemeris—can be incorrect. Ephemeris data is provided to a wireless terminal (e.g., by wireless infrastructure 111, etc.), in order to assist the wireless terminal in detecting and using the satellite's signals. The ephemeris data that the terminal uses must be kept current; otherwise, the wireless terminal can incorrectly proceed to generate GPS-based estimates. Consequently, with the wrong ephemeris data, a GPS-based measurement of the wireless terminal's elevation might be estimated and reported as, for example, 500 meters (or even as negative 500 meters) with an uncertainty of +/−10 meters, even though the actual elevation might be much less in magnitude. An error-caused difference of 500 meters between measured elevation and actual elevation translates to, at operation 1011, a pressure measurement bias of roughly 50 millibars, assuming one millibar of pressure change corresponds to roughly 10 meters of height.

In general, a given make and model of wireless terminal is known to exhibit a maximum actual bias, at least for the majority of such wireless terminals. A particular type of wireless terminal might be expected to have a pressure measurement bias, for example, of between +10 and −10 millibars 99% of the time. Consequently, the pressure measurement bias from the earlier example of 50 millibars is recognizable as being in error. This is because a bias of 50 millibars cannot be correct for a wireless terminal that is expected, at least in most cases, to have a measurement bias in the range of between +10 and −10 millibars.

Accordingly, location engine 113 adjusts the instantaneous estimate of bias uncertainty, $unc_{BIAS}$, generated at operation 1013 in order to reflect an instantaneous estimate of bias that it recognizes as being in error based on what is expected for the wireless terminal. Adjusting the uncertainty—in contrast with adjusting the measurement bias—is done so that the effect of bad orbital information—ephemeris or otherwise—is de-emphasized. Location engine 113 can generate an instantaneous estimate of bias uncertainty based on comparing the estimate of bias of barometric pressure to a predetermined, non-empty set of bias values.

The predetermined bias value or values can be based on the set of bias values expected for a given make or model or lot number of manufacture of wireless terminal, in any combination, such as those of the wireless terminal whose bias uncertainty is being determined (e.g., wireless terminal 101, etc.), for example and without limitation. The predetermined bias value or values can be based on the set of bias values expected for the age of the model of the wireless terminal (e.g., related to its launch date, etc.), or on the age of the particular wireless terminal itself (e.g., related to its date of manufacture, related to its date of activation, related to its amount of usage, etc.), or both, for example and without limitation. In some embodiments of the present invention, the set of bias values can be defined in terms of their range.

For example, whenever the estimate of bias is outside of an expected range of bias (e.g., 50 millibars calculated exceeding +/−10 millibars expected), location engine 113 can adjust the estimate of bias uncertainty to equal the estimate of the measurement bias itself or to some other predetermined value. In this example, the location engine can adjust an estimate of measurement bias of 50 millibars with +/−1 millibar uncertainty to 50 millibars with +/−50 millibars uncertainty.

By making the instantaneous uncertainty estimate consistent with the large instantaneous bias estimate, location engine 113 works with an adjusted uncertainty that better reflects something that is closer to the actual value of the uncertainty. The adjusted value can lessen the potentially adverse effect of the questionable instantaneous bias estimate.

In some embodiments of the present invention, location engine 113 transmits a message to the provider (e.g., wireless infrastructure 111, etc.) of the bad orbital information based on an adjustment at operation 1015 being performed, indicating a problem with the orbital information. For example and without limitation, location engine 113 can transmit the message based on the degree to which the bias lies outside of the expected range, can transmit the message every L times an adjustment is performed (i.e., L being a positive integer), and so forth.

In some embodiments of the present invention, the adjustment performed at operation 1015 is performed while using both Kalman filtering and matrix 322 to enforce a certain error distribution, while in other embodiments the adjustment at operation 1015 can be performed independent of, such as in the absence of, the use of Kalman filtering or the use of matrix 322, or both.

After operation 1015, control of task execution proceeds to operation 407.

Figure 11:
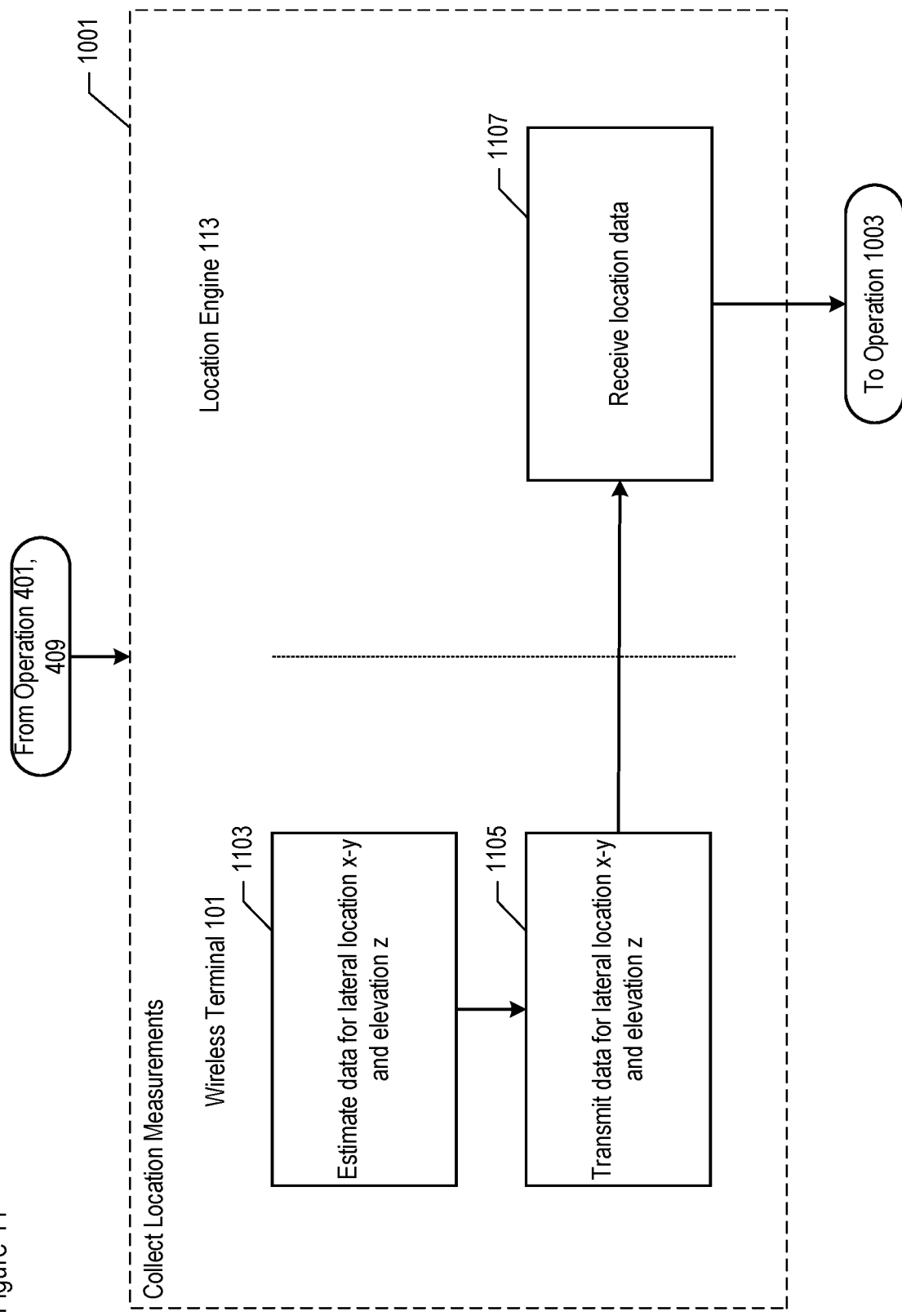
FIG. 11 depicts a flowchart of the salient processes performed in accordance with operation 1001.

Operation 1001: Collect Location Measurements—FIG. 11 depicts a flowchart of the salient processes performed in accordance with operation 1001.

At operation 1103, based on signals it receives from satellite constellation 121, wireless terminal 101 estimates a lateral location estimate of terminal 101's location x-y and a GPS-based measurement of terminal 101's elevation z, $Z_{GPS}$, at the terminal's lateral location x-y. In some embodiments of the present invention, wireless terminal also estimates a corresponding uncertainty for $Z_{GPS}$, referred to as $unc_{ALTZ}$.

At operation 1105, wireless terminal 101 transmits the lateral location estimate of terminal 101's location x-y and the GPS-based measurement $Z_{GPS}$. In some embodiments of the present invention, wireless terminal 101 also transmits $unc_{ALTZ}$.

At operation 1107, location engine 113 receives the location data transmitted at operation 1105. In some embodiments of the present invention, location engine 113 itself estimates the lateral location of wireless terminal 101, such as by using location-dependent information and location-dependent traits of one or more radio signals.

Operations 1103 through 1107 are performed continuously, concurrently, and asynchronously, in accordance with the illustrative embodiment.

Figure 12:
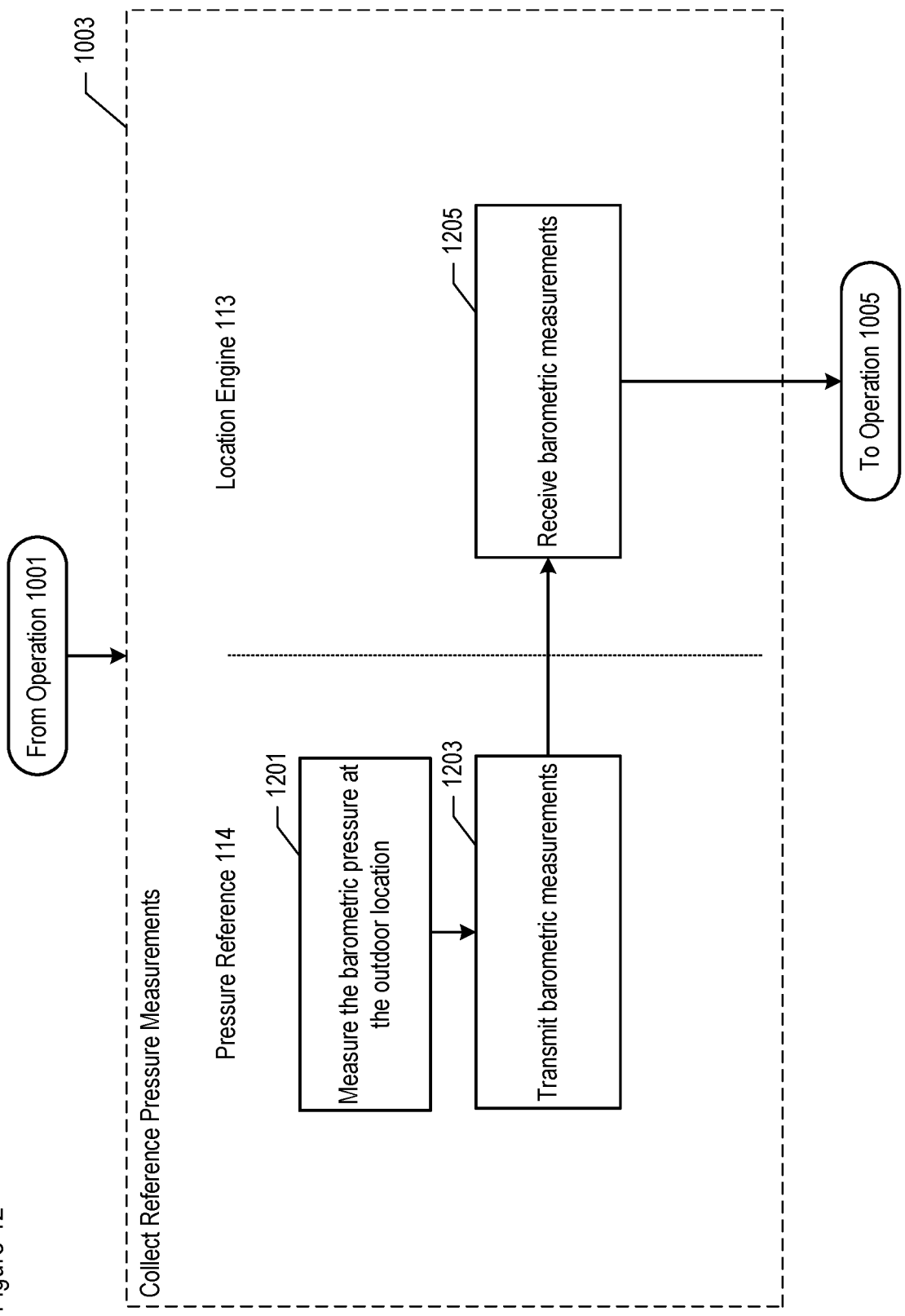
FIG. 12 depicts a flowchart of the salient processes performed in accordance with operation 1003.

Operation 1003: Collect Reference Pressure Measurements—FIG. 12 depicts a flowchart of the salient processes performed in accordance with operation 1003.

In accordance with operation 1201, pressure reference 114 samples barometric pressure in its vicinity, in order to form measurements. In some embodiments of the present invention, each measurement represents one sampling of barometric pressure, while in some other embodiments each measurement comprises more than one sampling of barometric pressure.

In accordance with operation 1203, pressure reference 114 transmits a measurement of atmospheric pressure from operation 1201—that is, provides a measurement of barometric pressure at an outdoor location—to location engine 113. In accordance with the illustrative embodiment, operation 1203 is performed every 10 minutes, but it will be clear to those skilled in the art how to make and use alternative embodiments of the present invention that transmit the measurements at other times.

In accordance with operation 1205, location engine 113 receives barometric pressure measurements transmitted in accordance with operation 1203. Location engine 113 receives the outdoor reference pressure, $P_{REF\_ALT}$, for lateral location x-y, described earlier, either from pressure reference 114 directly or based on the measurements made by reference 114, or both.

Operations 1201 through 1205 are performed continuously, concurrently, and asynchronously, in accordance with the illustrative embodiment.

Figure 13:
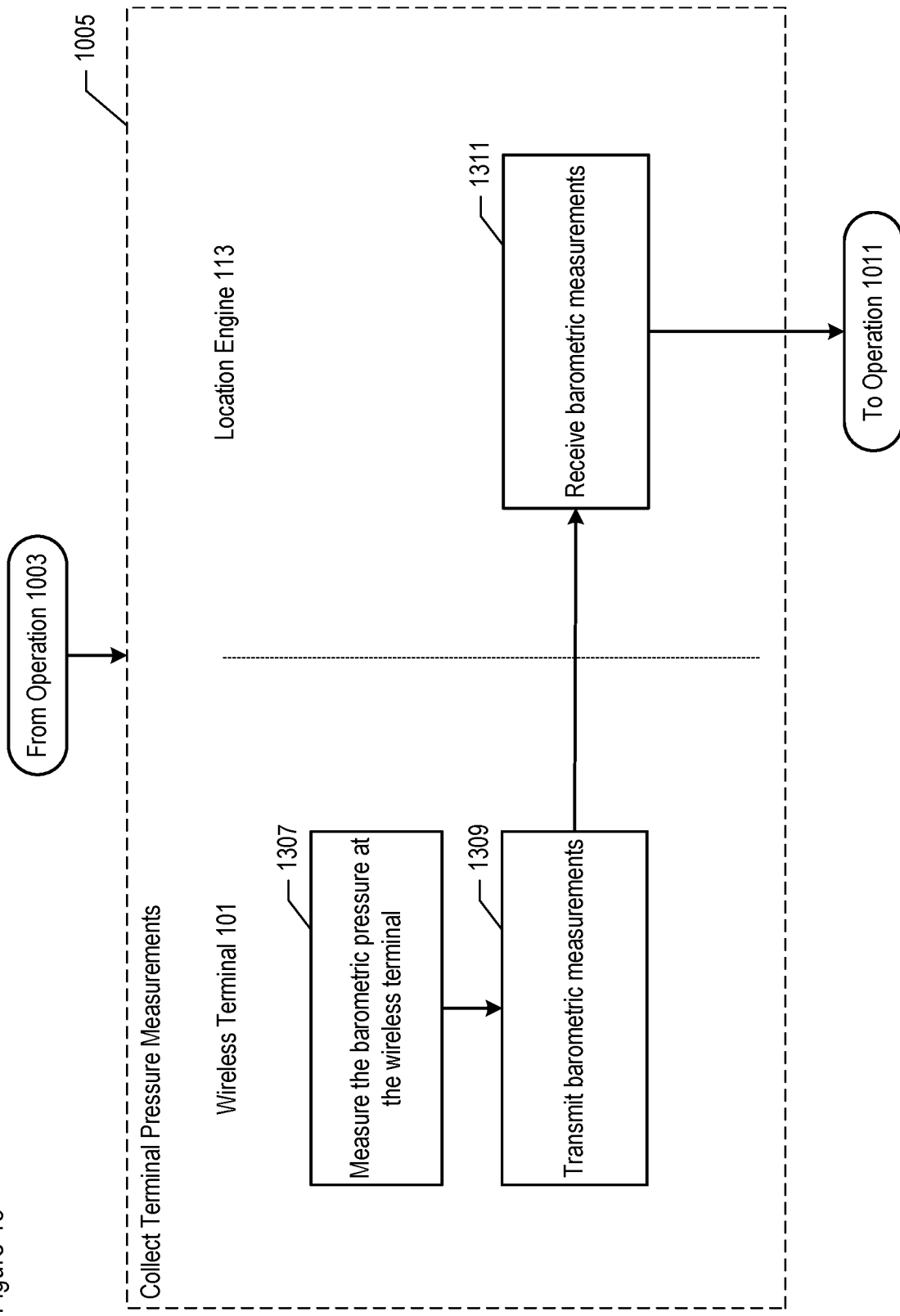
FIG. 13 depicts a flowchart of the salient processes performed in accordance with operation 1005.

Operation 1005: Collect Wireless Terminal Pressure Measurements—FIG. 13 depicts a flowchart of the salient processes performed in accordance with operation 1005.

In accordance with operation 1307, wireless terminal 101 samples barometric pressure in its vicinity by using its barometer 205, in order to form measurements. In some embodiments of the present invention, each measurement represents one sampling of barometric pressure, while in some other embodiments each measurement comprises more than one sampling of barometric pressure. In accordance with the illustrative embodiment, a sample of barometric pressure is taken once per second, but it will be clear to those skilled in the art how to make and use alternative embodiments of the present invention that take the samples at a different rate (e.g., 5 per second, 10 per second, etc.).

In accordance with operation 1309, wireless terminal 101 transmits measurements of barometric pressure, $P_{MEAS}$, to location engine 113, as derived from one or more samples from operation 1307. In accordance with the illustrative embodiment, operation 1309 is performed every 5 seconds, but it will be clear to those skilled in the art how to make and use alternative embodiments of the present invention that transmit the measurements of barometric pressure at other times.

In accordance with operation 1311, location engine 113 receives the barometric pressure measurements transmitted in accordance with operation 1309. In some embodiments of the present invention, location engine 113 combines the values of multiple pressure measurements (e.g., by calculating a median, etc.) in order to reduce measurement noise.

Operations 1307 through 1311 are performed continuously, concurrently, and asynchronously, in accordance with the illustrative embodiment.

Operation 411: Predict and Update the State of the Pressure Measurement Bias and the Bias Uncertainty—FIG. 14 depicts a flowchart of the salient processes performed in accordance with operation 411, in performing the Kalman filtering of the illustrative embodiment.

Figure 14:
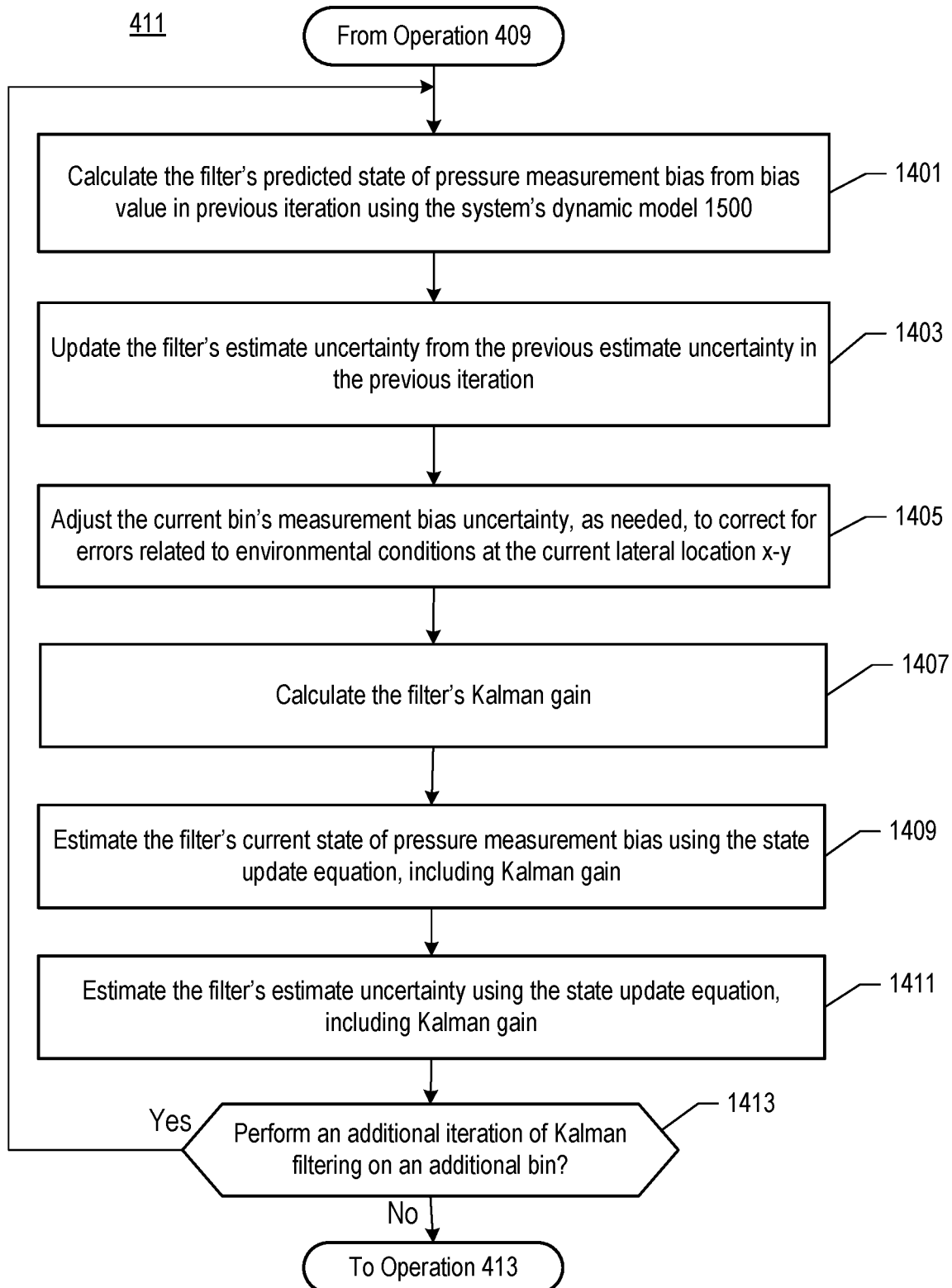
FIG. 14 depicts a flowchart of the salient processes performed in accordance with the Kalman filtering of the illustrative embodiment.

FIG. 14 is augmented with dynamic model 1500, which is depicted in FIG. 15. At least some of the reference numerals appearing as labels in FIG. 15 are also referenced elsewhere in the specification. The Kalman filter of the illustrative embodiment uses (i) the system's dynamic model 1500, (ii) known control inputs to the system, and (iii) multiple sequential measurements, to form an estimate of the system's varying quantities—that is, its "state." A state estimate that is based on multiple sequential measurements is generally better than an estimate obtained by using only one measurement alone.

Operations 1401 through 1411 depicted in FIG. 14 correspond to a single iteration of the Kalman filtering depicted in FIG. 15. Operations 1401 through 1411 are repeated for each iteration, wherein each iteration corresponds to a different set of estimates of measurement bias and bias uncertainty (i.e., instantaneous estimates in method 400, accumulated estimates in method 1700). Thus, the operations in FIG. 14 can be invoked multiple times in operation 411—that is, once for each set of estimates stored in each bin of matrix 322, across multiple bins.

As applied in the context of the illustrative embodiment, optimal Kalman filtering requires the error distribution in the elevation estimates to be ideally zero-mean Gaussian. Depending on the overall operating environment of wireless terminal 101, however, the error in the elevation estimates might or might not even approach zero-mean Gaussian. Such is the case when a limited number of bins corresponding to lateral locations are used in the Kalman filtering and each has an associated measurement bias attributed to that location's environment. Accordingly, in some operating environments, such as in some indoor environments, the error information has to be conditioned, to achieve optimal results.

To that end, in some embodiments of the present invention, location engine 113 enforces the use of a sufficient number and/or distribution of data points that conditions the error of the GPS estimates of elevation toward being zero-mean Gaussian. In various embodiments of the present invention, different GPS estimates of elevation—along with corresponding barometric pressure measurements also made by the wireless terminal—are used across:

iv. a representative sample of lateral geographic locations x-y (e.g., latitude/longitude, etc.), or "geolocations", and/or
  v. a representative sample of z-axis elevations, even for a given x-y location, and/or
  vi. sufficiently different times (e.g., time separations that are a function of satellite orbits, etc.), in any combination thereof.

Figure 16:
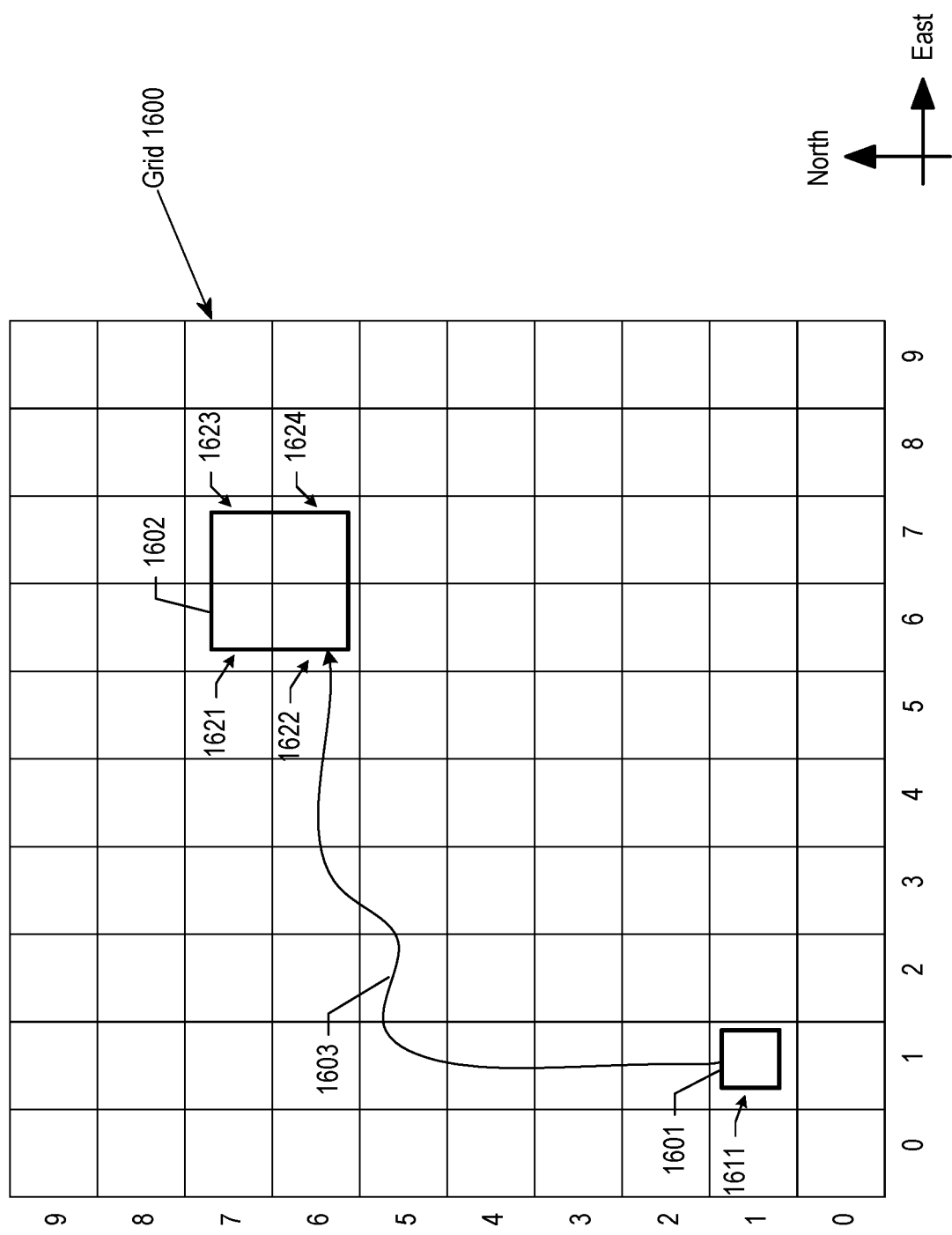
FIG. 16 depicts geographic grid 1600.

The location engine keeps track of the data points in lateral location matrix 322. This involves dividing up a geographic region into a J-by-K grid that partitions the geographic region into a plurality of possible lateral geographic locations of a wireless terminal, such as in FIG. 16. Each grid tile in geographic grid 1600, which is similar to grid 800 in FIG. 8, is representative of a lateral location x-y of the wireless terminal. In some embodiments, matrix 322 maintains only one set of representative data points—in particular, the bin's bias estimate and corresponding bias uncertainty stored into matrix 322 in accordance with operation 407 or 1707—for a given lateral location grid tile of predetermined area, regardless of whatever point or points within the lateral location the underlying measurements are made.

As location engine 113 accrues data for a representative sample of the different grid tiles, the location engine updates the Kalman filter as described below, either after each addition of a set of data points (i.e., into a bin corresponding to a grid tile) or after a predetermined number of additions, or after some combination of both. What constitutes a representative sample of the different grid tiles can be predetermined and/or adjusted over time, based on data accrued in advance by one or more wireless terminals.

Each wireless terminal (e.g., terminal 101, etc.) can have a different representative sample of the different grid tiles. For example and without limitation, a given wireless terminal's usage pattern can determine the particular grid tiles and/or the number of grid tiles to be used in the Kalman filtering across the grid tiles. By using the data points stored in accordance with operation 407 or 1701, and distributed across a sufficient distribution of lateral locations visited by wireless terminal 101, or across some other dimension as described herein, location engine 113 can enhance the estimates for measurement bias and bias uncertainty.

The individual operations of the Kalman filtering are now described. In accordance with operation 1401, location engine 113 calculates, for the filter, a predicted state from the previous state in the Kalman filtering in the previous iteration of this operation, using the system's dynamic model. In accordance with the illustrative embodiment, the dynamic model is constant; accordingly, the predicted state can be determined by:

$$x\_est_{n,n} = x\_est_{n,n-1}, \quad (Eq.\ 4)$$

wherein:
  n is the current iteration of operation 1401, and
  $x\_est_{n,n-1}$ is the previous state.

The time difference between consecutive iterations is accounted for in FIG. 15 by unit delay 1501. For the first iteration, location engine 113 uses an initial system state from operation 507.

In accordance with operation 1403, location engine 113 updates the filter's estimate uncertainty from the previous estimate uncertainty in the previous iteration of this operation. In some embodiments of the present invention, this can be determined by:

$$p_{n,n} = p_{n,n-1} + \text{drift\_rate} \cdot \text{time\_elapsed}, \quad (Eq.\ 5)$$

wherein:
  n is the current iteration of operation 1401,
  $p_{n,n-1}$ is the previous estimate uncertainty,
  drift_rate is set to a value to account for rate of measurement bias drift over time, and
  time_elapsed is the time elapsed between iterations n−1 and n.

For the first iteration, location engine 113 uses an initial estimate uncertainty from operation 505.

In accordance with operation 1405, because of environmental-related conditions at lateral location x-y, location engine 113 adjusts the current bin's estimate of bias uncertainty, $\text{unc}_{BIAS}$, as needed. The need for the adjustment is explained here. Depending on the track of wireless terminal 101, only a limited number of bins corresponding to lateral locations (e.g., "home" lateral location, "office" lateral location, etc.) might be available for the Kalman filtering, and each bin can have an associated measurement bias attributed to the environment of the corresponding lateral location. Specifically, the measurements made by wireless terminal 101 at a given lateral location might be highly correlated due to environment-related bias at that lateral location.

To reduce, or otherwise compensate for, the environment-related bias using geographically distributed measurement data, each lateral location can be assumed to have an inherent environment-related bias. Therefore, a lower bound for the bias uncertainty $\text{unc}_{BIAS}$ can be applied in order to reduce the estimation error. Put differently, the bias uncertainty for the lateral location and that is used in the Kalman filtering is determined as being the greater of (i) the unadjusted $\text{unc}_{BIAS}$ for the lateral location and (ii) a value that defines the lower bound.

The following example illustrates the problem. Suppose that wireless terminal 101 collects 60% of its measurement data from a "home" lateral location (i.e., home 1601 in FIG. 16 of the terminal's user), represented by grid tile 1611. Terminal 101 also collects 30% of its measurement data from an "office" lateral location (i.e., office 1602 of the user), represented by grid tiles 1621, 1622, 1623, and 1624. Lastly, terminal 101 collects 10% of its measurement data while traveling between the home and office lateral locations (i.e., one or more "road" lateral locations containing track 1603). In this example, there is no environment-related bias at the office or while on the road and respective 0.2-meter and 1.0-meter uncertainties; however, at home 1601 there is an environment-related bias of 10 meters with 0.1-meter uncertainty.

In the example, if location engine 113 were merely to apply Kalman filtering without a lower bound of bias uncertainty at each bin(x,y) within matrix 322 (i.e., corresponding to each lateral location), the bias uncertainty for the bin of home grid tile 1611 would be relatively small (i.e., 0.1-meter uncertainty). Consequently, home grid tile 1611's data would be weighted significantly when combined with measurement data from one or more bins of office grid tiles 1621 through 1624 (having 0.2-meter uncertainty) and from the one or more road locations along track 1603 (having 1.0-meter uncertainty).

In accordance with the illustrative embodiment, location engine 113 instead applies a lower bound of uncertainty (e.g., initially set to 0.5 meters, etc.) to the estimate of bias uncertainty currently stored at the bin(x,y) for the current iteration of the Kalman filtering. In other words, for a bias uncertainty currently stored in bin(x,y) for the current iteration that is less than the predetermined lower bound, location engine 113 bases the bias uncertainty to be used in the Kalman filtering on the lower bound, by setting the bias uncertainty to be equal to the lower bound.

In some embodiments of the present invention, in regard to refining the lower bound that is used for a given bin(x,y), location engine 113 can generate measurement bias and bias uncertainty statistics for various environments over time, and have this information available to improve calibration (i.e., bias adjustment) for another wireless terminal or terminals that are reporting measurement data from an already-characterized lateral location. Location engine 113 can apply the already-determined measurement bias adjustment and corresponding bias uncertainty based on which lateral location x-y the calibration data came from, thereby arriving faster at a calibrated bias for the other wireless terminal.

In accordance with operation 1407, location engine 113 calculates the filter's Kalman gain, as is known in the art. In the context of the illustrative embodiment, Kalman gain, $K_n$, is calculated as:

$$K_n = p_{n,n}/(p_{n,n} + \text{unc}_{BIAS(n)}), \quad \text{(Eq. 6)}$$

as depicted in FIG. 15, wherein:
  $p_{n,n}$ is the updated estimate uncertainty from Equation 5, and
  $\text{unc}_{BIAS(n)}$ is the adjusted estimate of the bias uncertainty stored in matrix 322 for the current lateral location bin, having been adjusted in operation 1405.

In accordance with operation 1409, location engine 113 estimates the new current state in the Kalman filtering using the state update equation below, which includes the Kalman gain calculated in accordance with operation 1405. In the context of the illustrative embodiment, the new current state is calculated according to the state update equation:

$$x\_\text{est}_{n+1,n} = x\_\text{est}_{n,n} + K_n*(\text{BIAS}(n) - x\_\text{est}_{n,n}), \quad \text{(Eq. 7)}$$

using the terms depicted in FIG. 15, wherein:
  $x\_\text{est}_{n,n}$ is the predicted state in the Kalman filtering from operation 1401,
  $K_n$ is the Kalman gain from Equation 6, and
  BIAS(n) is the estimate of the pressure measurement bias stored in matrix 322 for the current lateral location bin.

The estimate of the current state in the Kalman filtering is represented in FIG. 15 as element 1502. In at least some embodiments of the present invention, an enhanced estimate of the pressure measurement bias is set equal to this estimate of the current state, $x\_\text{est}_{n+1,n}$.

In accordance with operation 1411, location engine 113 updates the estimate uncertainty using the covariance update equation below, which includes the Kalman gain calculated in accordance with operation 1407. In the context of the illustrative embodiment, the estimate uncertainty $p_{n+1,n}$ is updated according to the covariance update equation:

$$p_{n+1,n} = (1-K_n)*p_{n,n}, \quad \text{(Eq. 8)}$$

using the terms depicted in FIG. 15, wherein:
  $K_n$ is the Kalman gain from Equation 6, and
  $p_{n,n}$ is the estimate uncertainty from Equation 5.

The updated estimate uncertainty is represented in FIG. 15 as element 1503. In at least some embodiments of the present invention, an enhanced estimate of the measurement bias uncertainty is set equal to this estimate uncertainty, $p_{n+1,n}$.

In accordance with operation 1413, location engine 113 determines whether it is to perform another iteration of Kalman filtering on an additional bin from matrix 322. Location engine 113 does so by determining whether an additional set of estimates is available and is to be processed—that is, from a different bin(x,y) of matrix 322 than the bin of the current iteration. For example, and consistent with the example presented earlier and in regard to operation 409 of method 400, location engine 113 iterates through the stored instantaneous estimates that correspond to the N different x-y locations that have those estimates stored. Alternatively, and consistent with operation 1709 of method 1700, location engine 113 iterates through the stored accumulated estimates that correspond to the N different x-y locations that have those estimates stored.

In at least some embodiments of the present invention, the particular bins that are selected for the multiple iterations of the Kalman filtering in FIG. 14 correspond to at least a subset of the lateral locations that wireless terminal 101 has visited. Such lateral locations can include one or more of grid tiles 1611, 1621, 1622, 1623, 1624, and one or more grid tiles containing track 1603, in FIG. 16.

If another iteration of the Kalman filtering is to be performed, then control of task execution proceeds back to operation 1401. Otherwise, control of task execution proceeds to operation 413 of method 400 or operation 1713 of method 1700, depending the method being used.

Operation of the illustrative Embodiment—FIG. 17 depicts a flowchart of the salient processes performed as part of method 1700 in accordance with the illustrative embodiment of the present invention.

Method 1700 features location engine 113 performing Kalman filtering both:
  i. within individual lateral locations visited by wireless terminal 101, as represented by the individual bins corresponding to lateral locations in matrix 322, and
  ii. across the different, Individually-filtered lateral locations visited by wireless terminal 101.

In other words, for each lateral location, location engine 113 continually filters over time the instantaneous estimates of measurement bias and measurement bias uncertainty obtained for each lateral location, thereby yielding an accumulated estimate set after each filtering for the lateral location. Additionally, at some point in the overall processing, location engine 113 filters the accumulated estimate sets across the multiple lateral locations, thereby yielding an enhanced estimate set that, in essence, combines the data across the multiple locations.

In accordance with operation 1701, GIS database 321 and lateral location matrix 322 are constructed and stored in memory 303 of location engine 113. Operation 1701 is similar to operation 401.

In accordance with operation 1703, location engine 113 obtains, for a given lateral location $x_i$-$y_i$, an estimate set comprising (i) an instantaneous estimate of the barometric pressure measurement bias of wireless terminal 101 and (ii) an instantaneous estimate of a corresponding pressure measurement bias uncertainty. Operation 1703 comprises the same steps as in operation 403 depicted in FIG. 10.

In accordance with operation 1705, location engine 113 predicts and updates the filter state of the bias and bias uncertainty for the lateral location $x_i$-$y_i$. In accordance with the illustrative embodiment, this comprises performing Kalman filtering on the current instantaneous estimate of bias and bias uncertainty. obtained in the current iteration of operation 1703. As part of operation 1705, location engine 113 determines an enhanced estimate of the measurement bias and bias uncertainty of wireless terminal 101.

Operation 1705 is the same as a single iteration of operations 1401 through 1411 depicted in FIG. 14, as applied to the ongoing filtering for the lateral location $x_i$-$y_i$. As those who are skilled in the art will appreciate after reading this specification, in some embodiments of the present invention, a different type of filtering or averaging than the Kalman filtering of the illustrative embodiment can be performed at operation 1705.

In accordance with operation 1707, location engine 113 updates bin($x_i$,$y_i$) in matrix 322 with an accumulated estimate set comprising the enhanced estimates of (i) bias and (ii) bias uncertainty determined at operation 1705, for the lateral location $x_i$-$y_i$.

In accordance with operation 1709, location engine 113 determines whether it is to perform filtering across one or more bins corresponding to one or more lateral locations, such as the Kalman filtering of the illustrative embodiment. For example and without limitation, the location engine can perform filtering once N bins (N equals at least 50, at least 100, at least 200, etc.) in matrix 322 have estimates stored—that is, N different x-y locations have estimates available. As another example, location engine 113 can perform filtering once a predetermined period of time has passed since the location engine first started tracking wireless terminal 101 via matrix 322. In some embodiments of the present invention, only bins containing sufficiently-filtered estimate sets are counted in the N bins—that is, bins on which a predetermined amount of Kalman filtering has been performed. In some other embodiments of the present invention, filtering can be performed on demand.

If filtering is to be performed, then control of task execution proceeds to operation 1711. Otherwise, control of task execution proceeds back to operation 1703 in order to continue to accumulate estimates of bias and uncertainty for each lateral location visited by wireless terminal 101.

In accordance with operation 1711, location engine 113 performs the Kalman filtering across the bins. In doing so, location engine 113 predicts and updates the filter state of the bias and bias uncertainty, based on the data stored in matrix 322 that corresponds to at least some of the lateral locations visited by wireless terminal 101.

In some embodiments, only bins containing accumulated estimate sets are used in the Kalman filtering of operation 1711, wherein accumulated estimate sets in this context refer to sets corresponding to bins in which the Kalman filtering of operation 1705 has been performed at least a predetermined, nonzero number of times (e.g., once, twice, 10 times, etc.). As part of operation 1711, location engine 113 determines an enhanced estimate, as distinguished from an instantaneous estimate of operation 1703 or an accumulated estimate of operation 1707, of the measurement bias and bias uncertainty of wireless terminal 101. Operation 1711 comprises the same steps as in operation 411, which is depicted in FIG. 14.

As those who are skilled in the art will appreciate after reading this specification, in some embodiments of the present invention, a different type of filtering or averaging than the Kalman filtering of the illustrative embodiment can be performed at operation 1711.

In accordance with operation 1713, location engine 113 generates an estimate of the current elevation of wireless terminal 101 based on the latest enhanced estimates of the pressure measurement bias and the bias uncertainty generated in accordance with operation 1711, and on a measurement of barometric pressure made by the terminal and coinciding with terminal's current elevation and lateral location. Operation 1713 comprises the same steps as in operation 413 depicted in FIG. 18.

In accordance with operation 1715, location engine 113 transmits:
  i. the enhanced estimate of measurement bias and/or bias uncertainty generated in accordance with operation 1711, and/or
  ii. the estimate of the elevation of wireless terminal 101 generated in accordance with operation 1713, and/or
  iii. an estimate of the lateral location of wireless terminal 101,
to location-based application server 112 and/or to wireless terminal 101 for use in a location-based application. In some embodiments of the present invention, location engine 113 displays (e.g., on a display, etc.) the estimate of lateral location and/or estimate of bias/bias uncertainty and/or estimate of elevation, instead of or in addition to transmitting them. It will be clear to those skilled in the art how to make and use embodiments of the present invention that perform operation 1715.

After operation 1715 is completed, location engine 113 can repeat the operations depicted in FIG. 17.

Figure 18:
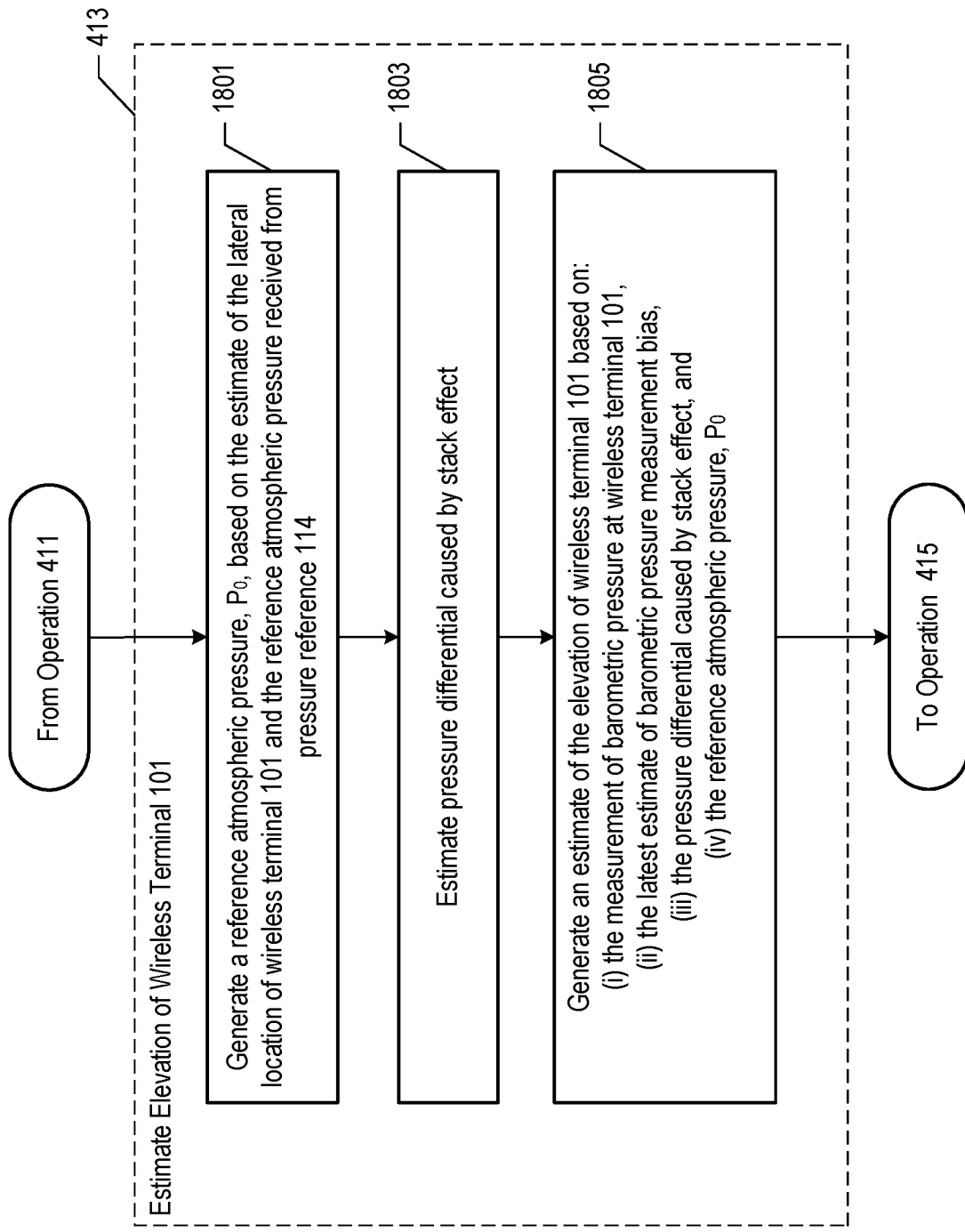
FIG. 18 depicts a flowchart of the salient processes performed in accordance with operation 413 of method 400.

Estimate the Elevation of Wireless Terminal 101—FIG. 18 depicts a flowchart of the salient processes performed in accordance with operation 413 of method 400, or operation 1713 of method 1700.

At operation 1801, location engine 113 generates $P_0$, which is an estimate of the reference atmospheric pressure for the lateral location that corresponds to the location for which the elevation of wireless terminal is being estimated and within geographic location 120, based on:

$$P_0 = \frac{P_W}{e^{-\left(\frac{Z_W}{H}\right)}} \qquad \text{(Eq. 9)}$$

wherein:
  $P_W$ is the measurement of atmospheric pressure received from pressure reference 114 that most closely corresponds in time to the measurement of atmospheric pressure of interest received from wireless terminal 101, $P_T$,
  $Z_W$ is the elevation of pressure reference 114 (1000 meters in the illustrative embodiment), and
  H is the scale height of the atmosphere, which is the elevation at which the atmospheric pressure has decreased to $e^{-1}$ times its value at mean sea level (e.g., approximately 7000 meters, etc.).

As those who are skilled in the art will appreciate after reading this specification, in some alternative embodiments $P_0$ can be determined using a different equation than that described above.

In accordance with the illustrative embodiment, location engine 113 has access to multiple pressure references, such as reference 114, and uses a measurement $P_W$ from the pressure reference that is the closest to the lateral location of wireless terminal 101, along with the $Z_W$ corresponding to said pressure reference. In some embodiments of the present invention, location engine 113 uses a measurement $P_W$ from the pressure reference that is most closely related to the lateral location, in some other way than the closest distance.

In some alternative embodiments of the present invention, $P_W$ and corresponding $Z_W$ are generated from the data originating from a plurality of pressure references, including reference 114, as part of a pressure reference network.

At operation 1803, location engine 113 generates an estimate of the pressure differential, $P_M$, based on a stack-effect compensation model. For details on a stack-effect compensation model, see for example and without limitation U.S. Pat. No. 9,237,423, which is incorporated by reference. It will be clear to those skill in the art, after reading this disclosure, how to make and use embodiments of the present invention that perform operation 1803.

At operation 1805, location engine 113 generates an estimate of the elevation of wireless terminal 101, $Z_T$, based on:

$$Z_T = -H * \ln\left(\frac{P_T - P_M}{P_0}\right) \quad \text{(Eq. 10)}$$

wherein:
H is the scale height of the atmosphere (described above),
$P_T$ is the relevant measurement of atmospheric pressure received from wireless terminal 101, adjusted by the estimate of bias of barometric pressure at wireless terminal 101 that is generated by location engine 113 in accordance with operation 411 of method 400 or operation 1711 of method 1700,
$P_M$ is the pressure differential determined in accordance with operation 1803, and
$P_0$ is the reference atmospheric pressure determined in accordance with operation 1801.

As those who are skilled in the art will appreciate after reading this specification, in some alternative embodiments $Z_T$ can be determined using a different equation than that described above.

The uncertainty of the elevation generated at operation 1805 is based on the current enhanced estimate of bias uncertainty, obtained from operation 411 or 1711, and possibly on one or more other uncertainties as well (e.g., current estimate of lateral location, current pressure measurement by the wireless terminal, etc.), In which the multiple uncertainties are combined into a final result.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method of estimating measurement bias of barometric pressure measured by a wireless terminal, the method comprising:
receiving, by the data processing system, a first plurality of estimates of elevations made by the wireless terminal, wherein the estimates of elevations in the first plurality correspond to different lateral locations of the wireless terminal, including a first estimate of a first elevation that corresponds to a first lateral location, and;
receiving, by the data processing system, a second plurality of measurements of barometric pressure made by the wireless terminal and representative of the different lateral locations of the wireless terminal, including a first measurement of barometric pressure that is representative of the first lateral location;
generating, by the data processing system, a third plurality of estimates of bias of barometric pressure measured by the wireless terminal and representative of the different lateral locations, including a first estimate of bias of barometric pressure that is representative of the first lateral location, wherein each estimate of bias of barometric pressure in the third plurality is based on (i) a corresponding measurement of barometric pressure made by the wireless terminal and in the second plurality, and (ii) a corresponding estimate of elevation made by the wireless terminal and in the first plurality; and
generating, by the data processing system, an enhanced estimate of bias of barometric pressure, by applying a first filter having a current state and previous states existing prior to the current state, wherein the current state is based on the third plurality of estimates of bias of barometric pressure, wherein the estimates of bias of barometric pressure in the third plurality are individually and iteratively applied to respective previous states of the first filter.

2. The method of claim 1 further comprising:
receiving, by the data processing system, a second measurement of barometric pressure made by the wireless terminal at a second elevation, wherein the second measurement of barometric pressure is separate from the measurements of barometric pressure in the second plurality;
generating, by the data processing system, an estimate of the second elevation of the wireless terminal based on:
(i) the second measurement of barometric pressure made by the wireless terminal, and
(ii) the enhanced estimate of bias of barometric pressure measured by the wireless terminal; and
transmitting the estimate of the second elevation of the wireless terminal to a location-based application server.

3. The method of claim 1, further comprising:
receiving a first uncertainty of the first estimate of the first elevation;
generating, by the data processing system, a first estimate of bias uncertainty for the first lateral location based on the first uncertainty of the first estimate of the first elevation;
wherein the first filter is a Kalman filter having a Kalman gain, and wherein the Kalman gain is based on a first value that defines a lower bound for the first estimate of bias uncertainty.

4. The method of claim 1, wherein each estimate of bias of barometric pressure in the third plurality is further based on a corresponding reference pressure value, including a first reference pressure value that is based on the first estimate of the first elevation made by the wireless terminal while at the first lateral location.

5. The method of claim 1, wherein the estimates of elevations in the first plurality are based on Global Positioning System (GPS) signals received by the wireless terminal.

6. The method of claim 1, wherein the first filter is a Kalman filter and uses, for each lateral location of the different lateral locations represented, a single estimate of bias of barometric pressure measured by the wireless terminal, to generate the enhanced estimate of bias of barometric pressure.

7. The method of claim 6, wherein the single estimate of bias of barometric pressure is the newest available estimate of bias of barometric pressure for the corresponding lateral location of the different lateral locations.

8. The method of claim 6, wherein the single estimate of bias of barometric pressure is the first available estimate of bias of barometric pressure for the corresponding lateral location of the different lateral locations, over a predetermined time period.

9. The method of claim 1, wherein the first lateral location is predetermined.

10. A method of estimating measurement bias of barometric pressure measured by a wireless terminal, the method comprising:
 receiving, by the data processing system, a first estimate of a first elevation made by the wireless terminal, wherein the first estimate of the first elevation corresponds to a first lateral location of the wireless terminal;
 receiving, by the data processing system, a first measurement of barometric pressure made by the wireless terminal and representative of the first lateral location;
 generating, by the data processing system, a first estimate of bias of barometric pressure measured by the wireless terminal based on (i) the first measurement of barometric pressure made by the wireless terminal and (ii) a first reference pressure value that corresponds to the first elevation and first lateral location; and
 generating, by the data processing system, an enhanced estimate of bias of barometric pressure, by applying a first Kalman filter having a current state and a previous state existing prior to the current state, wherein the current state is based on (i) the first estimate of bias of barometric pressure, (ii) the previous state of the first Kalman filter, and (iii) a Kalman gain, and wherein the previous state of the first Kalman filter is based in part on at least one additional estimate of bias that corresponds to at least a second lateral location of the wireless terminal.

11. The method of claim 10, further comprising:
 receiving, by the data processing system, a second measurement of barometric pressure made by the wireless terminal at a second elevation;
 generating, by the data processing system, an estimate of the second elevation of the wireless terminal based on:
  (i) the second measurement of barometric pressure made by the wireless terminal, and
  (ii) the enhanced estimate of bias of barometric pressure measured by the wireless terminal; and
 transmitting the estimate of the second elevation of the wireless terminal to a location-based application server.

12. The method of claim 10, further comprising:
 receiving a first uncertainty of the first estimate of the first elevation;
 generating, by the data processing system, a first estimate of bias uncertainty for the first lateral location based on the first uncertainty of the first estimate of the first elevation;
 wherein the Kalman gain is based on a first value that defines a lower bound for the first estimate of bias uncertainty.

13. The method of claim 12, further comprising:
 receiving a second uncertainty of the first measurement of barometric pressure;
 wherein the first estimate of bias uncertainty is further based on the second uncertainty of the first measurement of barometric pressure.

14. The method of claim 10, further comprising:
 generating, by the data processing system, a second estimate of bias of barometric pressure measured by the wireless terminal based in part on a second reference pressure value corresponding to the second lateral location of the wireless terminal;
 wherein the at least one additional estimate of bias comprises the second estimate of bias of barometric pressure, and wherein an updating of the previous state of the first Kalman filter occurs based on the second estimate of bias of barometric pressure corresponding to the second estimate of the second lateral location of the wireless terminal.

15. The method of claim 10, wherein the first estimate of the first elevation made by the wireless terminal is based on Global Positioning System (GPS) signals.

16. The method of claim 10, wherein the first Kalman filter uses, for each of the first lateral location and second lateral location, a single estimate of bias of barometric pressure measured by the wireless terminal, to generate the enhanced estimate of bias of barometric pressure.

17. The method of claim 16, wherein the single estimate of bias of barometric pressure is the newest available estimate of bias of barometric pressure for the corresponding lateral location.

18. The method of claim 16, wherein the single estimate of bias of barometric pressure is the first available estimate of bias of barometric pressure for the corresponding lateral location, over a predetermined time period.

19. The method of claim 10, wherein the first lateral location and the second lateral location are predetermined.

20. A method of estimating measurement bias of barometric pressure measured by a wireless terminal, the method comprising:
 receiving, by the data processing system, a first estimate of a first elevation made by the wireless terminal, wherein the first estimate of the first elevation corresponds to a first lateral location of the wireless terminal;
 receiving a first uncertainty of the first estimate of the first elevation;
 receiving, by the data processing system, a first measurement of barometric pressure made by the wireless terminal and representative of the first lateral location;
 generating, by the data processing system, a first estimate of bias of barometric pressure measured by the wireless terminal based on the first measurement of barometric pressure made by the wireless terminal;
 generating, by the data processing system, a first estimate of bias uncertainty for the first lateral location based on the first uncertainty of the first estimate of the first elevation; and
 generating, by the data processing system, an enhanced estimate of bias of barometric pressure, by applying a first Kalman filter having a current state and a previous state existing prior to the current state, wherein the current state is based on (i) the first estimate of bias of barometric pressure, (ii) the previous state of the first Kalman filter, and (iii) a Kalman gain, wherein the previous state of the first Kalman filter is based in part on at least one additional estimate of bias that corresponds to at least a second lateral location of the wireless terminal, and wherein the Kalman gain is based on a first value that defines a lower bound for the first estimate of bias uncertainty.

21. The method of claim 20, further comprising:
receiving, by the data processing system, a second estimate of a second elevation made by the wireless terminal, wherein the second estimate of second elevation corresponds to the second lateral location of the wireless terminal;
receiving a second uncertainty of the second estimate of the second elevation; and
generating, by the data processing system, a second estimate of bias uncertainty for the second lateral location based on the second uncertainty of the second estimate of the second elevation;
wherein the Kalman gain is further based on a second value that defines a lower bound for the second estimate of bias uncertainty.

22. The method of claim 21, wherein the first value and the second value are the same.

23. The method of claim 20, further comprising:
receiving a second uncertainty of the first measurement of barometric pressure;
wherein the first estimate of bias uncertainty is further based on the second uncertainty of the first measurement of barometric pressure.

24. The method of claim 20, wherein the first lateral location and the second lateral location are predetermined.

* * * * *